US007200124B2

(12) United States Patent
Kim et al.

(10) Patent No.: US 7,200,124 B2
(45) Date of Patent: Apr. 3, 2007

(54) SIGNAL MEASUREMENT APPARATUS AND METHOD FOR HANDOVER IN A MOBILE COMMUNICATION SYSTEM

(75) Inventors: Jung-Gon Kim, Seoul (KR); Hyeon-Woo Lee, Suwon-shi (KR); Sung-Ho Choi, Songnam-shi (KR); Ju-Ho Lee, Suwon-shi (KR); Hyoung-Gwan Kim, Seoul (KR); Du GaoKe, Beijing (CN); Li XiaoQiang, Beijing (CN); Wang Ting, Beijing (CN); Zhang Shuwei, Beijing (CN); Yong-Jun Kwak, Yongin-shi (KR); Kook-Heui Lee, Songnam-shi (KR); Sung-Oh Hwang, Yongin-shi (KR); Hye-Young Lee, Seoul (KR); Joon-Goo Park, Seoul (KR); Jin-Weon Chang, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 1026 days.

(21) Appl. No.: 10/298,341

(22) Filed: Nov. 18, 2002

(65) Prior Publication Data
US 2003/0117980 A1   Jun. 26, 2003

(30) Foreign Application Priority Data

Nov. 17, 2001 (KR) ............... 10-2001-0071655
Dec. 10, 2001 (KR) ............... 10-2001-0077974
Jan. 4, 2002 (KR) ............... 10-2002-0000526
Feb. 16, 2002 (KR) ............... 10-2002-0008345

(51) Int. Cl.
*H04Q 7/00* (2006.01)

(52) U.S. Cl. ............... 370/324; 370/332; 370/280; 370/342

(58) Field of Classification Search ............... None
See application file for complete search history.

(56) References Cited

U.S. PATENT DOCUMENTS

| 5,943,326 A | * | 8/1999 | Schroderus | ............... 370/324 |
| 6,434,128 B1 | * | 8/2002 | Benz et al. | ............... 370/329 |
| 6,907,014 B1 | * | 6/2005 | Kitade | ............... 370/280 |

FOREIGN PATENT DOCUMENTS

| EP | 0 979 017 | 2/2000 |
| JP | 2001-238252 | 8/2001 |
| JP | 2001-257635 | 9/2001 |

OTHER PUBLICATIONS

International Search Report dated Mar. 14, 2003, issued in a counterpart application, namely, Appln. No. PCT/KR02/02149.

* cited by examiner

*Primary Examiner*—Erika A. Gary
(74) *Attorney, Agent, or Firm*—The Farrell Law Firm

(57) ABSTRACT

An RNC determines parameters available for measurement of a synchronization signal and second Node B information from a second Node B, transmits the determined parameters to a first Node B during radio link setup and to a UE during radio bearer setup, and transmits parameter selection information to the first Node B and the UE, if it is recognized that measurement of the synchronization signal and the second Node B information is necessary. The first Node B changes a position of a downlink time period over which a downlink channel is transmitted from the first Node B to the UE and a position of an uplink time period over which an uplink channel is transmitted from the UE to the first Node B, according to parameters selected from the parameters. The UE receives the synchronization signal and the second Node B information in the remaining time periods except the changed downlink time period and the changed uplink time period among the plurality of time periods.

32 Claims, 23 Drawing Sheets

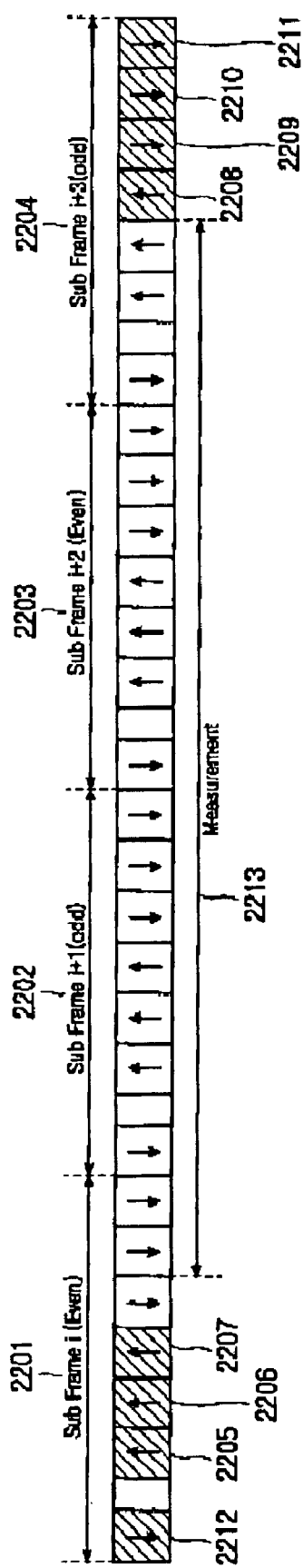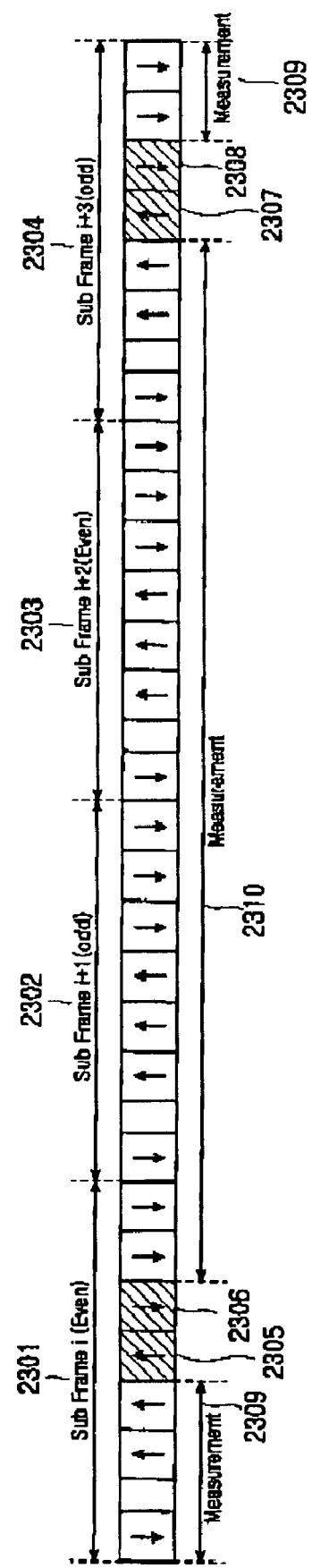
FIG.22
FIG.23

SIGNAL MEASUREMENT APPARATUS AND METHOD FOR HANDOVER IN A MOBILE COMMUNICATION SYSTEM

PRIORITY

This application claims priority to an application entitled "Traffic Channel Reassignment Method Based on Handover Measurement in a Mobile Communication System" filed in the Korean Industrial Property Office on Nov. 17, 2001 and assigned Serial No. 2001-71655, an application entitled "Improved Inter-system Measurement Method and Signaling Method Through Change of Channel Assignment Position in an NB-TDD CDMA Communication System" filed in the Korean Industrial Property Office on Dec. 10, 2001 and assigned Serial No. 2001-77974, an application entitled "Improved Apparatus and Method for Measuring Inter-frequency Signal and Inter-system Signal Through Change of Channel Assignment Position in an NB-TDD CDMA Communication System" filed in the Korean Industrial Property Office on Jan. 4, 2002 and assigned Serial No. 2002-526, and an application entitled "Improved Apparatus and Method for Measuring Inter-frequency Signal and Inter-system Signal Through Change of Channel Assignment Position in an NB-TDD CDMA Communication System" filed in the Korean Industrial Property Office on Feb. 16, 2002 and assigned Serial No. 2002-8345, the contents of all of which are incorporated herein by reference.

BACKGROUND OF THE INVENTION

1. Field of the Invention

The present invention relates generally to a signal measurement apparatus and method in a CDMA mobile communication system, and in particular, to a signal measurement apparatus and method in a handover state in a TDD-CDMA mobile communication system.

2. Description of the Related Art

In general, a $2^{nd}$ generation mobile communication system for primarily providing a voice service includes a GSM (Global System for Mobile Communications) system and an IS-95 (Interim Standard-95) system. The GSM system supporting TDMA (Time Division Multiple Access) was commercialized centering on Europe in 1992, while the IS-95 system supporting CDMA (Code Division Multiple Access) was commercialized centering on Korea and the United States.

Meanwhile, a $3^{rd}$ generation mobile communication system, evolved from the $2^{nd}$ generation mobile communication system, refers to a CDMA mobile communication system which supports not only a voice service but also a packet service. The $3^{rd}$ generation mobile communication system is classified into a 3GPP ($3^{rd}$ Generation Project Partnership) or UMTS (Universal Mobile Telecommunications system) system, an asynchronous mobile communication system led by Europe and Japan, and a 3GPP2 ($3^{rd}$ Generation Project Partnership 2) or CDMA2000 system, a synchronous mobile communication system led by the United State. In order to increase utilization efficiency of the limited channels, the 3GPP proposes a frequency division duplexing (FDD) system for separating uplink and downlink transmissions by frequency, and a time division duplexing (TDD) system for separating uplink and downlink transmissions by time. The TDD system is divided into a wideband TDD (WB-TDD) system using a chip rate of 3.84 Mcps (Mega chip per second), and a narrow band TDD (NB-TDD) system using a chip rate of 1.28 Mcps.

In an early stage when the $3^{rd}$ generation mobile communication system will be commercialized, services by the $2^{nd}$ generation mobile communication system will be provided in common with services by the $3^{rd}$ generation mobile communication system. However, since the $2^{nd}$ generation mobile communication system and the $3^{rd}$ generation mobile communication system use different frequencies and communication techniques, it is necessary to draw up a plan for securing compatibility between the two systems. In addition, it is necessary to make a plan for maintaining compatibility even between the $3^{rd}$ generation mobile communication systems supporting different frequencies. Particularly, in order to secure compatibility between the systems using different communication techniques and different frequencies, it is most important to properly perform a handover. That is, the systems supporting different communication techniques (FDD, WB-TDD, NB-TDD, GSM and CDMA2000) and the systems using different frequencies, though they support the same communication technique, may adjoin in several areas. In this state, if a UE (User Equipment) moves from an area of a current Node B supporting a specific communication technique and a specific frequency to an area of a new Node B using a different communication technique and a different frequency, a handover between the Node Bs is needed for global roaming. The handover between the Node Bs is classified into an inter-frequency handover and an inter-RAT (Radio Access Technology) handover.

First, the inter-RAT handover means a handover between the mobile communication systems using the different communication techniques. For the inter-RAT handover, a UE is required to monitor a state of a target Node B to which the UE is to be handed over. Herein, monitoring the target Node B will be referred to as "inter-RAT measurement."

Next, the inter-frequency handover means a handover between the mobile communication systems using the different frequencies, even though they use the same communication technique. Likewise, for the inter-frequency handover, a UE is required to monitor a target Node B, and herein, monitoring the target Node B will be referred to as "inter-frequency measurement."

For the inter-frequency measurement or the inter-RAT measurement, the $3^{rd}$ generation mobile communication system uses various measurement methods, and three typical measurement methods are as follows. A first measurement method is to discontinue communication with a current Node B for a predetermined time period, and measure a signal from a target Node B, received by a different communication technique at a different frequency band. A second measurement method is to increase a data rate of transmission data for a predetermined time period in order to maintain the quality of a current call even though communication with the current Node B is discontinued for the predetermined time period by the first measurement method. A third measurement method is to decrease a data rate of transmission data for a predetermined time period in order to maintain the quality of a current call even though communication with the current Node B is discontinued for the predetermined time period by the first measurement method.

The measurement methods can be differently applied according to whether time division duplexing is used or frequency division duplexing is used to separate the downlink transmission and the uplink transmission. In particular, when the time division duplexing is used to separate the downlink transmission and the uplink transmission, a UE performs the inter-frequency measurement or the inter-RAT measurement, using a period where the downlink and uplink transmissions are not performed.

Now, channel structures of a mobile communication system supporting the above-stated communication techniques will be described.

FIG. 1A illustrates a frame structure in a common mobile communication system supporting NB-TDD (hereinafter, referred to as an NB-TDD mobile communication system), and FIG. 1B illustrates structures of a time slot and a downlink pilot time slot (DwPTS) shown in FIG. 1A.

Referring to FIG. 1A, a frame 101 has a 12,800-chip length (10 ms) based on the chip rate of 1.28 Mcps used in the NB-TDD, and is comprised of two 5 ms subframes. The two subframes constituting the frame 101 have the same structure. Each subframe 102 is comprised of 7 time slots TS#0 to TS#6, a downlink pilot time slot (DwPTS) 104, an uplink pilot time slot (UpPTS) 106, and a guard period (GP) 105. Each time slot has an 864-chip length, and is used as an uplink (UL) time slot or a downlink (DL) time slot. In FIG. 1A, an Up arrow indicates UL time slots, and a Down arrow indicates DL time slots. The number of DL time slots and the number of UL time slots among the 7 time slots constituting the subframe 102 are determined according to a ratio of the uplink transmission data to the downlink transmission data. However, among the 7 time slots TS#0 to TS#6 constituting the subframe 102, a first time slot TS#0 must be normally used as a DL time slot and a second time slot TS#1 must be normally used as a UL time slot. Further, the 96-chip DwPTS 104, the 96-chip GP 105, and the 160-chip UpPTS 106 are interposed between the TS#0 and the TS#1. The DwPTS 104 is used by a UE to perform initial cell search, synchronization or channel estimation, and the UpPTS 106 is used by a Node B to perform channel estimation and acquire uplink synchronization with a UE. The GP 105 is used to prevent interference occurring in an uplink transmission signal transmitted over the TS#1 due to a multipath delay of a downlink transmission signal transmitted over the TS#0, as the neighboring TS#0 and TS#1 are used as a DL time slot and a UL time slot, respectively. In the NB-TDD, two switching points are required in one subframe in order to prevent interference due to the multipath delay, as described above. The switching points exist at a turning point between a DL time slot and a UL time slot. Of the two switching points, a first switching point is fixed between the DwPTS 104 and the UpPTS 106, and a second switching point is located in a specific position among the TS#1 to TS#6 according to a ratio of the uplink transmission data to the downlink transmission data.

Over the TS#1, a primary common control physical channel (P-CCPCH) 107 is transmitted using two codes. The codes are used to distinguish downlink channels using the same time slot or distinguish uplink channels using the same time slot in the NB-TDD mobile communication system. An orthogonal code of length 16 is typically used for the codes. The P-CCPCH 107 is a physical channel for transmitting a broadcasting channel (BCH) including system information of a Node B.

Referring to FIG. 1B, the P-CCPCH 107 includes two data fields 109 and 111, and a midamble field 110, and a GP 112. Data symbols transmitted over each of the data fields 109 and 111 are spread with a channelizatoin orthogonal code with a spreading factor (SF) 16, and have a 352-chip length. A midamble transmitted over the midamble field 110 has different functions for a DL time slot and a UL time slot. In the case of a DL time slot, the midamble is used by a UE to determine channels transmitted from a Node B and estimate a channel condition with the Node B. In the case of a UL time slot, the midamble is used by a Node B to determine channels transmitted from a UE and estimate a channel condition between the UE and the Node B. For the midamble, the P-CCPCH uses an m(1) code and an m(2) code. Each code is obtained by shifting a basic midamble code uniquely assigned to each cell. In the NB-TDD mobile communication system, m(1) code and m(2) code generated by shifting a basic midamble code are assigned to P-CCPCH regardless of a Node B. The m(2) code is used for a channel transmitted through a second antenna when a time switched transmit diversity (TSTD) is used. The GP 112, a 16-chip period existing in the last part of the time slot, is used to prevent interference occurring between signals on neighboring time slots.

The DwPTS 104 includes a 32-chip GP 113 and a 64-chip SYNC-DL code 114. The GP 113, together with the GP 112 of the TS#0, forms a 48-chip GP, and is used to prevent interference due to a multipath delay between the TS#0 and the DwPTS 104. The reason for allocating a long period of 48 chips to the GP is to correctly receive the SYNC-DL code 114 in the DwPTS 104, which plays an important role. The SYNC-DL code 114 is a signal which is first searched by the UE when it accesses the NB-TDD mobile communication system. The SYNC-DL code 114 is used by the UE to perform initial cell search and acquire synchronization with a cell. Therefore, if the SYNC-DL code 114 interferes with the signals transmitted over the TS#0, a UE cannot normally communicate with a Node B.

There exist 32 types of the SYNC-DL codes. Therefore, a UE determines a SYNC-DL code by calculating a correlation between a currently received signal having a highest signal level with the 32 available codewords, and acquires synchronization with a cell to which it belongs.

FIGS. 2A to 2C illustrate a channel structure in a common WB-TDD mobile communication system. Specifically, FIG. 2A illustrates a frame structure in a common WB-TDD mobile communication system, and FIGS. 2B and 2C illustrate exemplary structures of P-CCPCH, P-SCH (Primary Synchronization Channel), and S-SCH (Secondary Synchronization Channel). The P-CCPCH, P-SCH, and S-SCH illustrated in FIGS. 2B and 2C are first received by a UE when it measures a signal from the WB-TDD mobile communication system or accesses the WB-TDD mobile communication system. That is, the P-CCPCH is used by the UE to acquire Node B information of the WB-TDD mobile communication system, and the P-SCH and S-SCH are used by the UE to acquire synchronization with a Node B of the WB-TDD mobile communication system.

An important difference between the NB-TDD described in conjunction with FIGS. 1A and 1B and the WB-TDD lies in a bandwidth for transmitting data. That is, The NB-TDD uses a bandwidth of 1.28 MHz, whereas the WB-TDD uses a bandwidth of 3.84 MHz. In addition, unlike the NB-TDD, the WB-TDD does not have DwPTS and UpPTS. The midamble used in the NB-TDD and the preamble used in the WB-TDD have the same purpose, but they use different codes.

Referring to FIG. 2A, a frame 201 has a 38,400-chip length (10 ms) based on the chip rate of 3.84 Mcps used in the WB-TDD, and is comprised of 15 time slots TS#0 to TS#14. Each time slot 202 has a 2,560-chip length (0.67 ms), and is assigned as a DL time slot or a UL time slot.

As illustrated in FIGS. 2B and 2C, positions of P-CCPCH 204 and 210, P-SCH 205 and 211, and S-SCH 206 and 212 are determined in two different ways. In a first way, the P-CCPCH 204, P-SCH 205, and S-SCH 206 are simultaneously transmitted over TS#k 203, one of the 15 time slots, as illustrated in FIG. 2B. In a second way, the P-CCPCH 210, P-SCH 211, and S-SCH 212 are transmitted once over TS#k 208, and then the P-SCH 211 and S-SCH 212 are transmitted once again over TS#(k+8) 209, as illustrated in FIG. 2C. In either case, the P-SCH 205 and 211, the S-SCH 206 and 212 are transmitted leaving time offsets $t_{offset,n}$ 207 and 213 each having a 256-chip length. The P-SCH 205 and 211 are a single code used in common for all WB-TDD cells, and a channel which is first received by UEs. In particular, the P-SCH 205 and 211, since they are transmitted at the same time slot as the S-SCH 206 and 212, serve to indicate a position of the S-SCH 206 and 212. For the S-SCH 206 and 212, three codes are simultaneously transmitted, and each code has 32 kinds of arrangement, which are associated with one scrambling code group. The scrambling code is used to distinguish signals from neighboring Node Bs. The time offsets 207 and 213 are uniquely determined for each code group, and allow each code group to have a maximum correlation value in a different position. Since the WB-TDD fundamentally support a synchronous mobile communication system, if a UE is located in a cell boundary, the UE may experience performance degradation in receiving P-SCH and S-SCH from neighboring Node Bs at the same time slot. To solve this problem, the time offsets 207 and 213 are needed. That is, by allowing the neighboring Node Bs to transmit P-SCH and S-SCH using the time offsets 207 and 213, it is possible to increase reception performance of the P-SCH and S-SCH.

Therefore, a UE searches a cell through a correlation with the P-SCH, and determines a code group indicated by 3 S-SCHs by performing correlation with the S-SCH based on a phase of the P-SCH. At the moment, slot synchronization is acquired with a time offset value uniquely determined for the code group.

FIGS. 3A to 3C illustrate a channel structure in common GSM mobile communication system. Specifically, FIG. 3A illustrates a multiframe structure in a common GSM mobile communication system, and FIG. 3B illustrates positions of FCCH (Frequency Correction Channel) and SCH in the multiframe structure shown in FIG. 3A. Further, FIG. 3C illustrates structures of the FCCH and SCH. The FCCH and SCH illustrated in FIGS. 3B and 3C are channels which are first received by a UE when it measures a signal from a GSM mobile communication system or accesses the GSM mobile communication system. The FCCH and SCH are used by a UE when it searches a frequency used in the GSM mobile communication system and acquires synchronization with a Node B. The GSM mobile communication system, a typical $2^{nd}$ generation asynchronous mobile communication system, supports TDMA.

Referring to FIG. 3A, a multiframe 301 is a largest radio transmission unit in the SGM, and is comprised of 51 frames. Each frame 302 is comprised of 8 time slots TS#0 to TS#7.

Referring to FIG. 3B, FCCH is transmitted at a first time slot 304 in each of a first frame #0, an eleventh frame #10, a twenty-first frame #20, a thirty-first frame #30, and a forty-first frame #40 in the multiframe 301. SCH is transmitted at a first time slot 305 in each of a second frame #1, an twelfth frame #11, a twenty-second frame #21, a thirty-second frame #31, and a forty-second frame #41 in the multiframe 301.

Commonly, in the SGM mobile communication system, the FCCH and SCH used for synchronization between a Node B and a UE during measurement for initialization or a handover have a structure illustrated in FIG. 3C.

FIG. 4 illustrates a frame structure in a common FDD mobile communication system, and a structure of P-CCPCH and SCH transmitted over the frame. The P-CCPCH and SCH are channels which are first received by a UE when it measures a signal from an FDD mobile communication system or accesses the FDD mobile communication system. In the FDD mobile communication system, a downlink channel and an uplink channel are separated by frequency. Shown in FIG. 4 is a frame structure used for a downlink channel. For example, FIG. 4 illustrates an exemplary method of transmitting P-SCH, S-SCH, and P-CCPCH.

The P-CCPCH and SCH have the same function as the P-CCPCH and SCH in the WB-TDD. However, a process of acquiring synchronization and information by SCH in the FDD is different from the process of acquiring synchronization and information by SCH in the WB-TDD.

Referring to FIG. 4, a frame 401 has a 38,400-chip length (10 ms) and is comprised of 15 time slots TS#0 to TS#14. Each time slot 402 has a 2,560-chip length (0.67 ms).

P-SCH 403 and S-SCH 404, transmitted in the foremost 256-chip period of each time slot, have the same function as the P-SCH and S-SCH in the WB-TDD. However, a process of acquiring synchronization and information by the P-SCH 403 and S-SCH 404 in the FDD is different from the process of acquiring synchronization and information by the P-SCH and S-SCH in the WB-TDD. The P-SCH 403, as described in conjunction with the WB-TDD, is a unique channel used in all Node Bs or cells supporting the FDD, and is repeatedly transmitted 15 times over the 15 time slots of the frame. For the S-SCH 404, there are 16 codes in total, and 15 codes are selected from the 16 codes and transmitted at each time slot. A UE detects slot synchronization with a Node B or cell through the P-SCH 403, and detects the 15 codes from the S-SCH 404 based on the slot synchronization. The 15 codes in the S-SCH 404 search a specific code group among 64 code groups according to code arrangements of the S-SCH 404. That is, the code arrangement can indicate a specific code group among the 64 code groups. Each of the code groups has 8 downlink scrambling codes used to distinguish Node Bs. In addition, since the code arrangement is formed to be able to distinguish the order of time slots constituting one frame, a UE can determine a boundary of the frame depending on the code arrangement.

After determining the frame boundary, the UE detects a scrambling code used in a current Node B among 8 scrambling codes, in the code group, using a primary common pilot channel (P-CPICH). The P-CPICH, though not illustrated in FIG. 4, can be used to estimate a channel environment or measure a power loss from a Node B to a UE. The P-CPICH transmits a signal generated by multiplying an all-1's sequence by a downlink scrambling code used in a Node B. Therefore, the UE acquires a downlink scrambling code used in the Node B through correlation between a signal transmitted over the P-CPICH and 8 scrambling codes in the code group. The acquired downlink scrambling code is a scrambling code having a maximum correlation value determined by calculating correlation values by the correlation. The UE analyzes P-CCPCH 406 based on the acquired scrambling code. The P-CCPCH 406 has the same function as the P-CCPCH used in the WB-TDD. The P-CCPCH 406 is channel-spread with an all-1's Walsh code among Walsh codes of length 256, which are channelization orthogonal codes. Therefore, by detecting the scrambling code used by a Node B to transmit the P-CCPCH 406, the UE can analyze the P-CCPCH 406. The channelization orthogonal codes are used to distinguish channels transmitted from a Node B to UEs in an area of the Node B, or distinguish several channels transmitted from one UE to the Node B. For downlink transmission, channelization orthogonal codes of length 4 to 512 are used, and for uplink transmission, channelization orthogonal codes of length 4 to 256 are used. A length of the orthogonal codes indicates a spreading factor of data. As the spreading factor of data increases, a spreading gain also increases. In addition, when transmitted at the same power level, data with a greater spreading factor can be transmitted in higher quality. The P-CCPCH 406 is a channel over which BCH with system information of a Node B is transmitted. Therefore, a UE acquires information on a cell or Node B to which the UE currently belongs, by receiving the P-CCPCH 406 and decoding the BCH included therein. However, since TTI (Transport Time Interval), a decoding unit of the BCH, is 20 ms, a UE should be able to receive P-CCPCH 406 for 20 ms in order to acquire system information included in BCH from a cell or Node B to which the UE itself belongs. That is, the UE must receive P-CCPCH 406 transmitted over two frames in order to acquire the system information.

FIG. 5 illustrates a situation where inter-frequency measurement or inter-RAT measurement must be performed. It will be assumed in FIG. 5 that a Node B 501 supports NB-TDD, and another Node B 502 also supports the NB-TDD but uses a frequency different from the frequency used by the Node B 501, or the Node B 502 supports other communication techniques except the NB-TDD. The other communication techniques may include the $2^{nd}$ and $3^{rd}$ generation communication standards such as GSM, FDD, WB-TDD, CDMA2000, and IS-95. In addition, it will be assumed that a UE 503 can communicate not only by the NB-TDD but also by other communication techniques, and is moving toward the Node B 502 while exchanging voice or packet signals with the Node B 501. On this assumption, the UE 503 is required to perform inter-frequency measurement for a handover from a Node B supporting NB-TDD to a Node B using a different frequency though it supports the NB-TDD. Further, the UE 503 is required to perform inter-frequency measurement or inter-RAT measurement for a handover from a Node B supporting the NB-TDD to a Node B supporting a different communication technique.

Referring to FIG. 5, when the UE 503 in communication with the Node B 501 (hereinafter, referred to as a source Node B) moves toward the Node B 502 (hereinafter, referred to as a target Node B), the UE 503 receives an inter-frequency measurement command or an inter-RAT measurement command from the source Node B 501, and then measures a signal from the target Node B 502. The signal from the target Node B 502 refers to a signal based on the communication techniques stated above. The source Node B 501 transmits an inter-frequency measurement command or an inter-RAT measurement command to the UE 503 in the case where after analyzing results of measuring by the UE 503 signals from other Node Bs supporting NB-TDD at the frequency band used by the source Node B 501, the source Node B 501 determines that a signal level is too low for the UE 503 to perform a handover, or a signal level between the source Node B 501 and the UE 503 becomes lower little by little.

The UE 503 acquires information on synchronization with the target Node B 502 and system information of the target Node B 502 by measuring a signal from the target Node B 502, and transmits the measurement result to the source Node B 501. In response to a command from the source Node B 501 based on the measurement result, the UE 503 continues a current call through a handover to the target Node B 502.

Up to the present, a description has been made of an operation performed in the case where the UE 503 receives an inter-frequency measurement command or an inter-RAT measurement command through a call established with the source Node B 501. However, even when no call is established between the UE 503 and the source Node B 501, the UE 503 can perform the inter-frequency measurement or the inter-RAT measurement depending on inter-frequency measurement information or inter-RAT measurement information included in the system information on BCH transmitted over P-CCPCH. Alternatively, if the source Node B 501 has information on a communication technique used by the target Node B 502, the source Node B 501 may previously provide the UE 503 with information on the communication technique used by adjacent Node Bs before the UE 503 performs inter-frequency measurement or inter-RAT measurement, so that the UE 503 can simply acquire system information and synchronization signals from the neighboring Node Bs.

FIG. 6 illustrates a period in which a UE in communication with a Node B supporting NB-TDD can perform inter-frequency measurement or inter-RAT measurement. Referring to FIG. 6, reference numeral 601 denotes an $i^{th}$ subframe between a UE and a Node B. The UE performs uplink transmission at a second time slot 603 among 7 time slots constituting the $i^{th}$ subframe, and performs downlink transmission at a fifth time slot 604. The UE performs inter-frequency measurement or inter-RAT measurement in a period of the other time slots where the uplink transmission and the downlink transmission are not performed. In FIG. 6, the UE can perform inter-frequency measurement or inter-RAT measurement in the periods represented by reference numerals 605, 606, 607 and 608 in two consecutive subframes. However, for the periods where the UE can actually perform inter-frequency measurement or inter-RAT measurement, consideration should be taken into a radio frequency transition time required for shifting a frequency band where an inter-frequency signal and an inter-RAT signal are transmitted, and a radio frequency transition time required for returning to the original frequency band.

In order to enable the UE to simply perform the inter-frequency measurement or inter-RAT measurement and increase reliability of the measurements, it is preferable to increase a period where the UE can actually perform inter-frequency measurement or inter-RAT measurement.

As stated above, a length of the period where the inter-frequency measurement or the inter-RAT measurement can be performed is determined based on positions of the uplink time slots and downlink time slots. That is, the measurement period depends upon the positions of the uplink time slots and downlink time slots.

Therefore, if the period where the UE actually performs inter-frequency measurement or inter-RAT measurement is short, the UE may not be able to perform normal inter-frequency measurement or inter-RAT measurement. Further, when measuring SCH and P-CCPCH transmitted by FDD, the UE may not correctly decode the contents of BCH transmitted over the S-SCH and P-CCPCH. In other words, since a basic transmission unit in the NB-TDD and FDD is a 10 ms frame, timing in the NB-TDD and timing in the FDD have a specific time offset. Therefore, since the UE measures S-SCH and P-CCPCH in a specific position, the UE cannot correctly measure BCH transmitted over the S-SCH and P-CCPCH. This is because for normal analysis, the S-SCH must receive a signal with a 10 ms length, and the P-CCPCH must receive a signal with a 20 ms length.

SUMMARY OF THE INVENTION

It is, therefore, an object of the present invention to provide an apparatus and method for changing channel assignment positions of uplink and downlink transport channels in an NB-TDD mobile communication system.

It is another object of the present invention to provide an apparatus and method for measuring inter-frequency signals having different frequencies by changing channel assignment positions of uplink and downlink transport channels in an NB-TDD mobile communication system.

It is further another object of the present invention to provide an apparatus and method for measuring an inter-system signal with another system not supporting NB-TDD by changing channel assignment positions of uplink and downlink transport channels in an NB-TDD mobile communication system.

It is yet another object of the present invention to provide a signaling method for changing channel assignment positions of uplink and downlink transport channels in an NB-TDD mobile communication system.

It is still another object of the present invention to provide an apparatus and method for performing inter-frequency measurement or inter-RAT measurement using a period where a UE does not perform transmission and reception, in a communication system which separates uplink transmission and downlink transmission on a time-division basis.

It is still another object of the present invention to provide an apparatus and method for efficiently assigning inter-frequency measurement or inter-RAT measurement by increasing a length of a measurement period for inter-frequency measurement, and inter-frequency measurement or inter-RAT measurement, and changing a position of the measurement period in an NB-TDD system.

It is still another object of the present invention to provide a method for changing transmission position of uplink and downlink channels of a UE which measures an inter-frequency signal and an inter-RAT signal in order to efficiently perform inter-frequency measurement or inter-RAT measurement.

It is still another object of the present invention to provide an apparatus and method for increasing measurement performance and reliability by changing positions of uplink time slots and downlink time slots to, maximally increase a period for inter-frequency measurement or inter-RAT measurement for monitoring a signal from an NB-TDD system using a frequency band different from a frequency band currently used by a UE in another NB-TDD system.

It is still another object of the present invention to provide an apparatus and method for increasing measurement performance and reliability by changing positions of uplink time slots and downlink time slots to maximally increase a period for inter-frequency measurement or inter-RAT measurement for monitoring a signal from a system supporting a communication technique different from a communication technique supported by an NB-TDD system.

It is still another object of the present invention to provide an apparatus and method for reassigning channels to a UE and other UEs in a Node B to which the UE belongs in order to increase an inter-frequency measurement period or an inter-RAT measurement period.

It is still another object of the present invention to provide an apparatus and method for performing inter-frequency measurement or inter-RAT measurement based on index information indicating predetermined pattern information in case of necessity for inter-frequency measurement or inter-RAT measurement by making a previous agreement between a Node B and a UE upon the predetermined pattern information for inter-frequency measurement or inter-RAT measurement to change a position of a period for the inter-frequency measurement or inter-RAT measurement.

To achieve the above and other objects, the present invention provides a method for measuring by a UE a synchronization signal on a control channel and second Node B information from a second Node B by a UE in a system including a first Node B, the second Node B adjacent to the first Node B, and the UE in a cell occupied by the first Node B, the first Node B and the UE using a TDD-CDMA communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a TDD communication technique using a frequency band different from that of the TDD CDMA communication technique, the synchronization signal for synchronizing the UE with the second Node B and the control channel indicating the second Node B information being transmitted from the second Node B to the UE over at lest one time period among the plurality of time periods. The method changes a position of the downlink time period over which the downlink channel is transmitted from the first Node B to the UE, and a position of the uplink time period over which the uplink channel is transmitted from the UE to the first Node B, so that the time period of the control channel transmitted from the second Node B to the UE should be located within a previous subframe and a next subframe, or a frame.

To achieve the above and other objects, the present invention provides a method for measuring by a UE a synchronization signal on a control channel and second Node B information from a second Node B in a system including a first Node B, the second Node B adjacent to the first Node B, and the UE in a cell occupied by the first Node B, the first Node B and the UE using a TDD CDMA communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a communication technique different from that of the TDD CDMA communication technique, the synchronization signal for synchronizing the UE with the second Node B and the control channel indicating the second Node B information being transmitted over at lest one downlink channel transmitted from the second Node B to the UE. The method changes a position of the time period over which the downlink channel is transmitted from the first Node B to the UE, and a position of the time period over which the uplink channel is transmitted from the UE to the first Node B, so that the time period of the control channel transmitted from the second Node B to the UE should be located within a previous subframe and a next subframe, or a frame.

To achieve the above and other objects, the present invention provides a method for measuring by a UE a synchronization signal on a control channel and second Node B information from a second Node B in a system including a first Node B, the second Node B adjacent to the first Node B, a radio network controller for managing the first Node B, and the UE in a cell occupied by the first Node B, the first Node B and the UE using a TDD CDMA communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronization signal for synchronizing the UE with the second Node B and the control channel indicating the second Node B information being transmitted over at lest one downlink channel transmitted from the second Node B to the UE. The method comprises determining by a RNC (Radio Network Controller) all parameters available for measurement of the synchronization signal and the second Node B information, transmitting the determined parameters to the first Node B during radio link setup, and transmitting the determined parameters to the UE during radio bearer setup; if it is recognized by the RNC that measurement of the synchronization signal and the second Node B information is necessary, transmitting to the first Node B and the UE parameter selection information for measuring the synchronization signal and the second Node B information; changing by the first Node B and the UE a position of a downlink time period over which the downlink channel is transmitted from the first Node B to the UE and a position of an uplink time period over which the uplink channel is transmitted from the UE to the first Node B, according to parameters selected from all the parameters based on the parameter selection information; and receiving by the UE the synchronization signal and the second Node B information transmitted from the second Node B in the remaining time periods except the changed downlink time period and the changed uplink time period among the plurality of time periods.

To achieve the above and other objects, the present invention provides a method for measuring a synchronization signal on a control channel and second Node B information from a second Node B by a UE (User Equipment) in a system including a first Node B, the second Node B adjacent to the first Node B, a radio network controller (RNC) for managing the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronizing the UE for synchronization with the second Node B and the control channel indicating the second Node B information being transmitted over at least one downlink channel transmitted from the second Node B to the UE. The method comprises determining by the RNC all parameters available for measurement of the synchronization signal and the second Node B information, transmitting to the first Node B and the UE any one of the determined parameters if the RNC recognizes that the UE is required to measure the synchronization signal and the second Node B information; changing by the first Node B and the UE a position of a downlink time period over which the downlink channel is transmitted from the first Node B to the UE and a position of an uplink time period over which the uplink channel is transmitted from the UE to the first Node B, according to parameters selected by the RNC based on parameter selection information; and receiving by the UE the synchronization signal and the second Node B information transmitted from the second Node B in the remaining time periods except the changed downlink time period and the changed uplink time period among the plurality of time periods.

To achieve the above and other objects, the present invention provides an apparatus for measuring by a UE a synchronization signal on a control channel and second Node B information from a second Node B in a system including a first Node B, the second Node B adjacent to the first Node B, a radio network controller (RNC) for managing the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronization signal for synchronizing the UE with the second Node B and the control channel indicating the second Node B information being transmitted over at lest one downlink channel transmitted from the second Node B to the UE. The RNC determines all parameters available for measurement of the synchronization signal and the second Node B information, transmits the determined parameters to the first Node B during radio link setup, transmits the determined parameters to the UE during radio bearer setup, and transmits parameter selection information for measuring the synchronization signal and the second Node B information to the first Node B and the UE, if it is recognized that measurement of the synchronization signal and the second Node B information is necessary. The first Node B changes a position of a downlink time period over which the downlink channel is transmitted from the first Node B to the UE and a position of an uplink time period over which the uplink channel is transmitted from the UE to the first Node B, according to parameters selected from all the parameters based on the parameter selection information. The UE changes a position of a downlink time period over which the downlink channel is transmitted from the first Node B to the UE and a position of an uplink time period over which the uplink channel is transmitted from the UE to the first Node B, according to parameters selected from all the parameters based on the parameter selection information, and receives the synchronization signal and the second Node B information transmitted from the second Node B in the remaining time periods except the changed downlink time period and the changed uplink time period among the plurality of time periods.

To achieve the above and other objects, the present invention provides an apparatus for measuring by a UE a synchronization signal on a control channel and second Node B information from a second Node B in a system including a first Node B, the second Node B adjacent to the first Node B, a radio network controller for managing the first Node B, and the UE in a cell occupied by the first Node B, the first Node B and the UE using a TDD CDMA communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronization signal for synchronizing the UE with the second Node B and the control channel indicating the second Node B information being transmitted over at lest one downlink channel transmitted from the second Node B to the UE. The RNC determines all parameters available for measurement of the synchronization signal and the second Node B information, transmits any one of the determined parameters to the first Node B and the UE if it is recognized that the UE is required to measure the synchronization signal and the second Node B information. The first Node B changes a position of a downlink time period over which the downlink channel is transmitted from the first Node B to the UE and a position of an uplink time period over which the uplink channel is transmitted from the UE to the first Node B, according to parameters selected by the RNC based on parameter selection information. The UE changes a position of a downlink time period over which the downlink channel is transmitted from the first Node B to the UE and a position of an uplink time period over which the uplink channel is transmitted from the UE to the first Node B, according to parameters selected by the RNC based on parameter selection information, and receives the synchronization signal and the second Node B information transmitted from the second Node B in the remaining time periods except the changed downlink time period and the changed uplink time period among the plurality of time periods.

BRIEF DESCRIPTION OF THE DRAWINGS

The above and other objects, features and advantages of the present invention will become more apparent from the following detailed description when taken in conjunction with the accompanying drawings in which:

FIGS. 22 to 24 and 26A to 26D illustrate examples of a measurement period pattern according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

First, a definition of parameters used to describe the present invention will be given herein below.

Measurement Period Staring Point (MPSP): this indicates a starting point of inter-frequency measurement or inter-RAT measurement.

Measurement Period (MP): this indicates a period where positions of uplink and downlink transport channels between a UE and a Node B are changed for inter-frequency measurement or inter-RAT measurement, and the number of MPs is n.

Measurement Period Interval (MPI): this indicates an interval between neighboring MPs.

Measurement Period Sequence (MPS): this indicates a sequence for inter-frequency measurement or inter-RAT measurement, and the MPS is comprised of n MPs and k MPIs.

MPS Repetition Number (MPSRN): this indicates the number of MPS repetitions for inter-frequency measurement or inter-RAT measurement, and the MPSRN is expressed with a positive number of 1 to M.

Now, preferred embodiments of the present invention will be described in detail with reference to the accompanying drawings.

Figure 21:
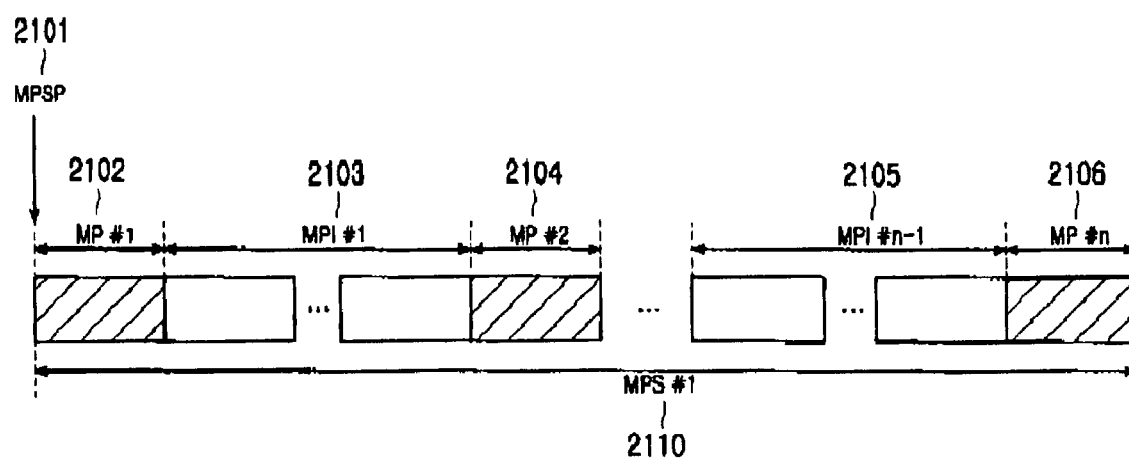
FIG. 21 illustrates a structure of a measurement period sequence according to an embodiment of the present invention.

FIG. 21 is a diagram for explaining the parameters MPSP, MP, MPI, MPS and MPSRN, defined above. Referring to FIG. 21, MPSP 2101 indicates a starting point of inter-frequency measurement or inter-RAT measurement by UE, and is determined using a system frame number (SFN) or a system subframe number (S-SFN) used to distinguish the transmission order of a transport frame in an NB-TDD Node B, or a connection frame number (CFN) used to distinguish the transmission order of frames exchanged between a Node B and a UE. The SFN has a value of 0 to 4,095 in an NB-TDD communication system, and when performing a specific operation with a UE, the Node B informs the UE of a starting point or an ending point of the specific operation using the SFN. The S-SFN is a value associated with a subframe used in an NB-TDD communication system, has a value of 0 to 8,195, and is identical in function to the SFN. The CFN is used to distinguish the transmission order of uplink and downlink radio transport frames, when a call is set up between a Node B and a UE. Unlike the SFN or the S-SFN, which is commonly used in one Node B, the CFN is uniquely set between the Node B and one UE. The CFN ranges from 0 to 255. The Node B can inform a UE, which intends to perform inter-frequency measurement or inter-RAT measurement, of the measurement period starting point using any of the SFN, S-SFN and CFN.

MP#1 2102, MP#2 2104, . . . , MP#n 2106 indicate periods where a UE actually measures an inter-frequency signal or an inter-RAT signal. The MP#1 2102, MP#2 2104, . . . , MP#n 2106 may have different lengths, and a length of the MPs can be determined depending on a measurement item of a UE which performs the inter-frequency measurement or inter-RAT measurement, and the number of downlink and uplink channels used in a Node B connected to the UE. The least unit of the MP may include a subframe, and the largest unit of the MP may include several frames.

Examples of the MP are illustrated in FIGS. 7 to 10. It is assumed in FIGS. 7 to 10 that the MP is a 10 ms frame and a Node B communicates with a UE using a frame having the structures illustrated in FIGS. 7 to 10. That is, an arrangement of downlink time slots and an arrangement of uplink time slots can be set taking into consideration an amount of uplink and downlink transmission data in a Node B. However, in the following description, it will be assumed that the uplink and downlink time slots are arranged as illustrated in FIGS. 7 to 10. In addition, it will be assumed that the UE currently performs communication at a frequency f1, and an inter-RAT signal that the UE desires to measure has a frequency f2.

Figure 7:
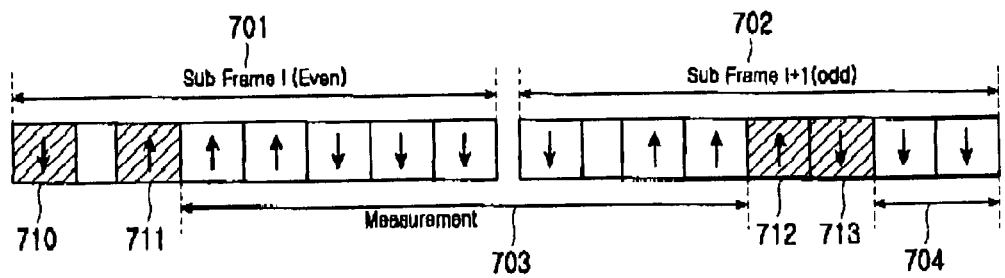
FIGS. 7 to 10 illustrate examples of a period for searching a target Node B in a handover state in an NB-TDD mobile communication system according to an embodiment of the present invention.

FIG. 7 illustrates an example of MP, wherein an inter-RAT measurement period can be extended. For the convenience of explanation, it will be assumed that a UE performs uplink transmission using a specified one of uplink time slots represented by an Up arrow, and performs downlink transmission using a specified one of downlink time slots represented by a Down arrow. In addition, it will be assumed that the UE performs communication using one unique channelization orthogonal code at each uplink/downlink time slot.

Reference numeral 701 represents a first subframe of a given frame, and reference numeral 702 represents a second subframe of the given frame. In the case where inter-RAT measurement must be performed in one frame comprised of the subframe 701 and the subframe 702, in order to secure a measurement period having a possible maximum length in the structure of the subframe 701 and the subframe 702, it is preferable to assign uplink and downlink channels of a UE which intends to perform inter-frequency measurement or inter-RAT measurement, to a downlink time slot 710 and an uplink time slot 711 of the subframe 701 and an uplink time slot 712 and a downlink time slot 713 of the subframe 702. This is to extend an actual measurement period by reducing the number of frequency transitions occurring when the UE shifts from a current communication frequency f1 to a measurement frequency f2. If the uplink and downlink channels of the UE that intends to perform inter-frequency measurement or inter-RAT measurement are randomly scattered over unspecified time slots in the subframe 701 and the subframe 702, the UE frequently shifts between f1 and f2 in order to perform inter-frequency measurement or inter-RAT measurement, thus reducing an actual measurement period.

One frame of a measurement period 703, a period for which inter-frequency measurement or inter-RAT measurement is to be performed, can provide a period of at least 8 consecutive time slots including a period of DwPTS, GP, and UpPTS. That is, in the subframe 701, the inter-RAT measurement can be performed in a 5-time slot period from a time slot 711 assigned an uplink channel of the UE to the last time slot of the subframe 701. In addition, as to the subframe 702 following the subframe 701, a 3-time slot period from a first time slot of the subframe 702 to a time slot preceding the time slot 712 assigned an uplink channel of the UE, and a period of DwPTS, UpPTS and GP can be added as a period available for the inter-frequency measurement or inter-RAT measurement.

Therefore, the measurement period 703 has a length including a 7-time slot period and a period of DwPTS, UpPTS and GP interposed between a fist time slot and a second time slot of the second subframe 702, and a measurement period 704 includes two time slots following a time slot 713. The measurement period 703, which is rarely generated in the conventional channel assignment method, is very long, contributing to an increase in performance of the inter-frequency measurement or inter-RAT measurement.

Further, in order to make the MP illustrated in FIG. 7, a Node B may reserve channelization orthogonal codes of the time slot 710 and the time slot 713 for downlink channel assignment of UEs that intend to perform inter-frequency measurement or inter-RAT measurement, and then first assign the reserved channelization orthogonal codes to UEs that must perform the inter-frequency measurement or inter-RAT measurement, or reassign the reserved channelization orthogonal codes to the UEs that must perform the measurement. In addition, a Node B may reserve channelization orthogonal codes of the time slot 711 and the time slot 712 for uplink channel assignment of UEs that intend to perform inter-frequency measurement or inter-RAT measurement, and then first assign the reserved channelization orthogonal codes to UEs that must perform the inter-frequency measurement or inter-RAT measurement, or reassign the reserved channelization orthogonal codes to the UEs that must perform the measurement. Therefore, UEs that do not perform the inter-frequency measurement or inter-RAT measurement are first assigned time slots other than the time slot 710, time slot 711, time slot 712 and time slot 713, for uplink and downlink transmissions. Alternatively, if there exist UEs that perform uplink and downlink transmissions using the time slot 710, time slot 711, time slot 712 and time slot 713 among the UEs that do not perform the inter-frequency measurement or inter-RAT measurement, the UEs are reassigned time slots other than the time slot 710, time slot 711, time slot 712 and time slot 713, for uplink and downlink transmissions.

Figure 8:
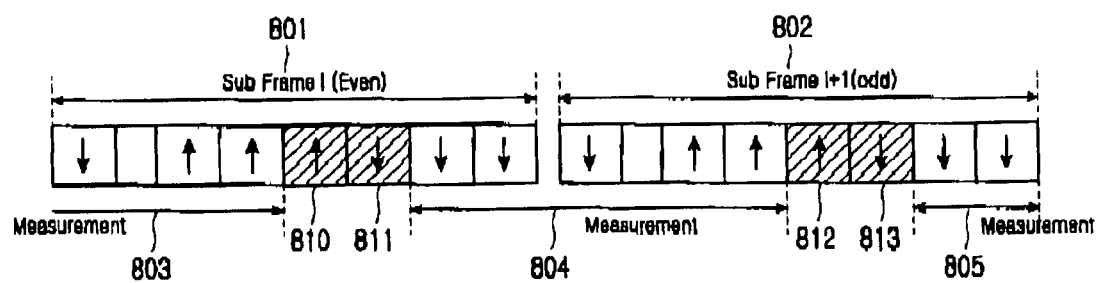

FIG. 8 illustrates another example of the MP described in conjunction with FIG. 21. As to a difference with the MP of FIG. 7, a predetermined number of DL channelization codes and UL channelization codes are reversed for a DL time slot 811, a DL time slot 813, a UL time slot 810 and a UL time slot 812 which are arranged at both sides of a switching point. Therefore, when a Node B and a UE, which perform traffic transmission and reception at the f1, are required to measure a signal transmitted at the f2, one of the reversed DL channelization codes and one of the reversed UL channelization codes are reassigned. However, since a time slot #0 of each subframe is chiefly used by P-CCPCH or other downlink shared channels, there is a limitation on the number of channelization orthogonal codes that can be assigned to UEs which are required to perform inter-frequency measurement or inter-RAT measurement. Therefore, the number of UEs which are required to perform inter-frequency measurement or inter-RAT measurement, supportable by the method presented in FIG. 8 is greater than the number of UEs which are required to perform inter-frequency measurement or inter-RAT measurement, supportable by the method presented in FIG. 7.

In FIG. 8, if the inter-frequency measurement or inter-RAT measurement must be performed in one frame comprised of a first subframe 801 and a second subframe 802, it is possible to provide a measurement period 803, a measurement period 804 and a measurement period 805. The measurement period 804 has at least 5 consecutive time slots after a time slot 811, including a transmission period of DwPTS, GP and UpPTS, and is longer on the average as compared with when uplink and downlink transport channels of UEs are located in unspecified time slots.

Meanwhile, considering a structure of consecutive frames, since the measurement period 803 and measurement period 805 can also use 3 time slots after a time slot 813 and two time slots before a time slot 810, including a transmission period of DwPTS, GP and UpPTS, they are longer on the average as compared with when uplink and downlink transport channels of UEs are located in unspecified time slots.

Figure 9:
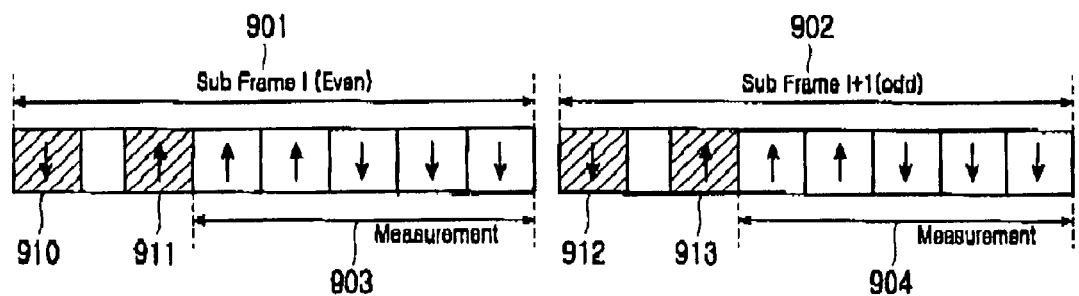

FIG. 9 illustrates another example of the MP described in conjunction with FIG. 21. In FIG. 9, a time slot 910 and a time slot 911 of a first subframe 901 are assigned for uplink and downlink transmissions of a UE that is required to perform inter-frequency measurement or inter-RAT measurement, and a time slot 912 and a time slot 913 of a second subframe 902 are assigned for uplink and downlink transmissions of a UE that is required to perform inter-frequency measurement or inter-RAT measurement. In the method of FIG. 9, since a UE that measures an inter-frequency signal or an inter-RAT signal receives a downlink channel at a time slot #0 of a subframe, the UE can receive P-CCPCH and other downlink shared channels transmitted at the time slot #0. Therefore, the UE can receive information on a change in system information of a current Node B at any time. In addition, the UE, since it receives DwPTS as well, can analyze information transmitted by the DwPTS, i.e., information on synchronization adjustment with a current Node B.

A measurement period 903 and a measurement period 904 of FIG. 9 include 5 time slots after a time slot 911 and a time slot 913, respectively.

Figure 10:
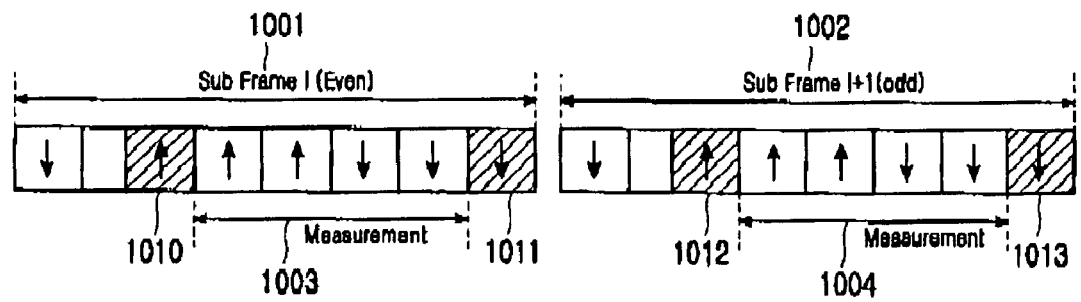

FIG. 10 illustrates a further another example of the MP described in conjunction with FIG. 21. In FIG. 10, a time slot 1010 and a time slot 1011 of a first subframe 1001 are assigned for uplink and downlink transmissions of a UE that is required to perform inter-frequency measurement or inter-RAT measurement, and a time slot 1012 and a time slot 1013 of a second subframe 1002 are assigned for uplink and downlink transmissions of a UE that is required to perform inter-frequency measurement or inter-RAT measurement. In the method of FIG. 10, since a UE that measures an inter-frequency signal or an inter-RAT signal receives a downlink signal at the last time slot of a subframe preceding a time slot #0 of a next subframe, and transmits an uplink signal at a time slot #1 succeeding the time slot #0, the UE can receive a downlink shared channel from a Node B which currently performs communication using f1, at the time slot #0. In addition, since the time slot #0 is not used, it is possible to support more UEs which are required to perform inter-RAT measurement.

A measurement period 1003 and a measurement period 1004 of FIG. 10 include 4 time slots between a time slot 1010 and a time slot 1011, and 4 time slots between a time slot 1012 and a time slot 1013, respectively.

Figure 24:
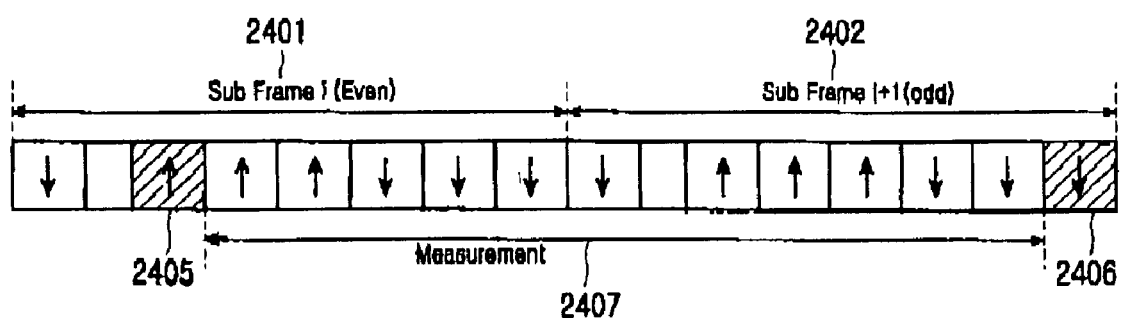

FIGS. 7 to 10 illustrate examples of a 10 ms MP. However, FIGS. 22 and 23 illustrate examples of a 20 ms MP, and FIG. 24 illustrates an example of a 10 ms MP using a method different from the methods used in FIGS. 7 to 10.

FIG. 22 illustrates an example of MP provided by connecting two radio frames to generate a longer measurement period. In FIG. 22, a UE that intends to perform inter-frequency measurement or inter-RAT measurement uses one time slot per subframe for uplink and downlink communication with a current Node B, in the same manner as described in conjunction with FIGS. 7 to 10. In FIG. 22, uplink and downlink transmission data is assigned to time slots of both a subframe 2201 and a subframe 2204. That is, if a time slot 2205, a time slot 2206, a time slot 2207 and a time slot 2208 are used for uplink transmission of the UE, and a time slot 2209, a time slot 2210, a time slot 2211 and a time slot 2212 are used for downlink transmission of the UE, then two time slots of a subframe 2201 after the time slot 2207, a subframe 2202, a subframe 2203, two time slots and a period of DwPTS, GP and UpPTS before a time slot 2307 of a subframe 2204, can be assigned as a measurement period 2213.

In FIG. 22, a method of assigning channels over two radio frames by a UE that intends to perform inter-frequency measurement or inter-RAT measurement is more complex than a method of assigning channels to the UE in FIGS. 7 to 10. However, it is possible to provide a longer measurement period than the measurement period of FIGS. 7 to 10.

A method of making MP of FIG. 23, on the assumption that a UE that intends to perform inter-frequency measurement or inter-RAT measurement uses one time slot per subframe for each of uplink and downlink transmissions, allows a UE that intends to perform inter-frequency measurement or inter-RAT measurement to perform uplink and downlink communications with a current Node B by decreasing the number of time slots in use during MP, thereby increasing a measurement period 2309 and a measurement period 2310. In FIG. 23, a UE that intends to perform inter-frequency measurement or inter-RAT measurement performs uplink and downlink transmissions using two channelization orthogonal codes in each of a period of a time slot 2305 and 2306 and a period of a time slot 2307 and a time slot 2308. That is, the method of FIG. 23 allows a UE that intends to perform inter-frequency measurement or inter-RAT measurement to use more channel resources during MP, in order to reduce a time period of actually received time slots, thereby increasing a measurement period. In FIG. 23, considering a structure of consecutive frames, a measurement period 2309 includes 3 time slots and a period of DwPTS, GP and UpPTS before a time slot 2305 of a subframe 2301, and two time slots after a time slot 2308 of a subframe 2304. The measurement period 2310 includes two time slots after a time slot 2306 of a subframe 2301, a subframe 2302, a subframe 2303, 3 time slots and a period of DwPTS, GP and UpPTS before a time slot 2307 of a subframe 2304.

FIG. 24 illustrates how to apply to a 10 ms frame the method (FIG. 23) of reducing a time period of actually received time slots by assigning more channel resources to a UE that intends to perform inter-frequency measurement or inter-RAT measurement during MP. In FIG. 24, a UE that performs inter-frequency measurement or inter-RAT measurement performs uplink transmission at a time slot 2405 and downlink transmission at a time slot 2406. Therefore, a measurement period 2407 includes 5 time slots of a subframe 2401 and 6 time slots and a period of DwPTS, GP and UpPTS of a subframe 2402.

In the methods introduced in FIGS. 23 and 24, a UE that intends to perform inter-frequency measurement or inter-RAT measurement makes MP using channel resources used in a current Node B during the MP period by a channel resource change method instead of a simple channel resource assignment method.

FIGS. 26A to 26D illustrate a method of extending a measurement period of a UE using a repetition period and a repetition length of a channel assignment method in 3GPP TDD.

In FIGS. 26A to 26D, the repetition period is 1, 2, 4, 8, 16, 32 and 64 radio frames, and for each repetition period, uplink transmission or downlink transmission or uplink/downlink transmissions are repeatedly performed. The repetition length represents the number of consecutive frames that undergo uplink transmission or downlink transmission in the repetition period, and has a value smaller than "(repetition period)−1."

Figure 26A:
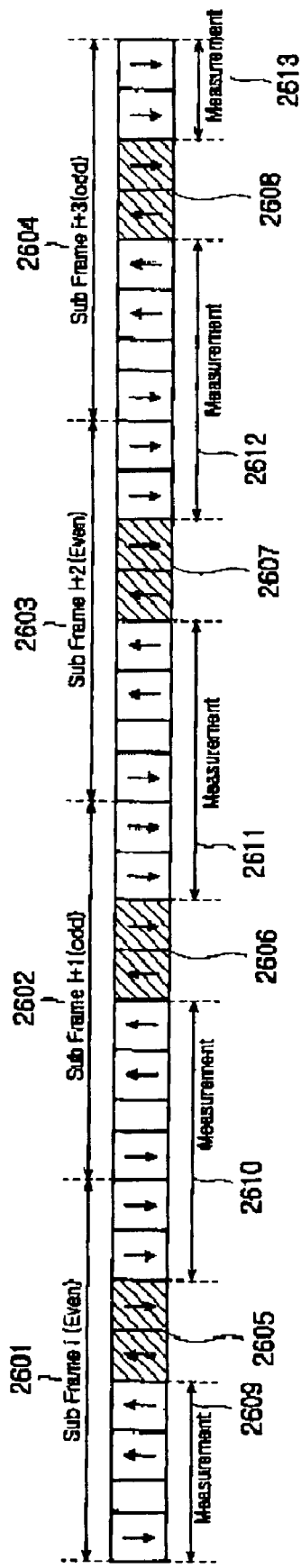

The repetition period will be described with reference to FIG. 26A. A UE performs uplink transmission and downlink reception using uplink/downlink time slots 2605 of a subframe 2601, uplink/downlink time slots 2606 of a subframe 2602, uplink/downlink time slots 2607 of a subframe 2603, and uplink/downlink time slots 2608 of a subframe 2604. A repetition period of uplink/downlink transmissions by the UE becomes a 10 ms frame, and a repetition length also becomes a 10 ms frame. FIG. 26C illustrates an example of the channel of FIG. 26A, modified to have a 10 ms repetition period and a 20 ms repetition length. That is, a UE can perform uplink/downlink transmissions every 10 ms, and if the repetition period is 20 ms, the UE performs uplink/downlink transmissions at periods of 20 ms. That is, the "repetition period" refers to a value for fully transmitting uplink/downlink transmission data for a certain period regardless of an amount of the uplink/downlink transmission data of a UE.

Figure 26B:
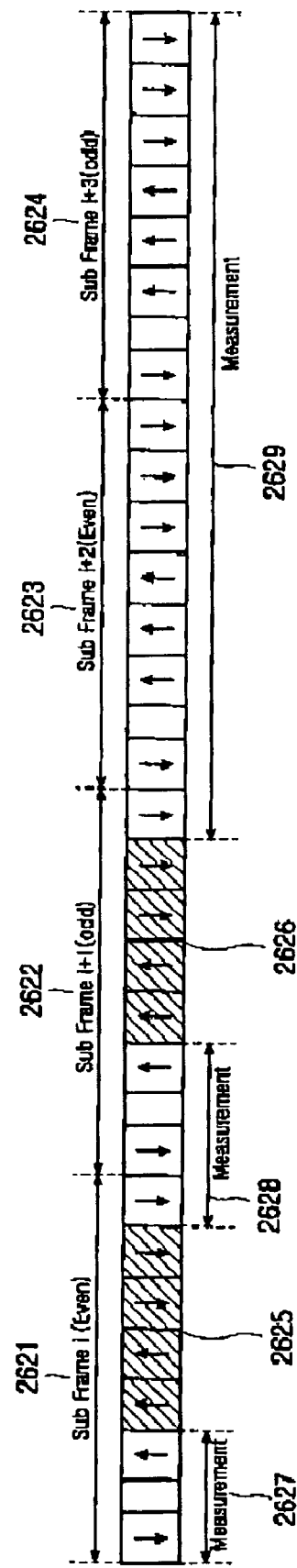
Figure 26C:
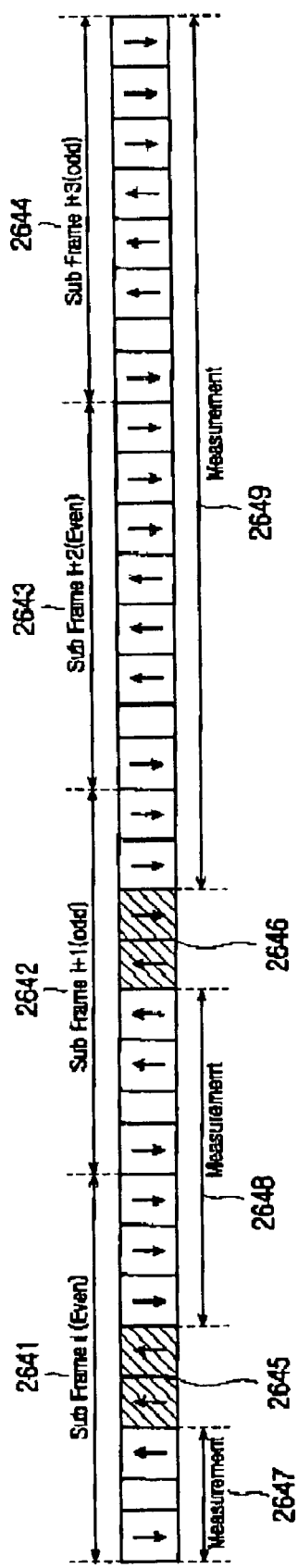
Figure 26D:
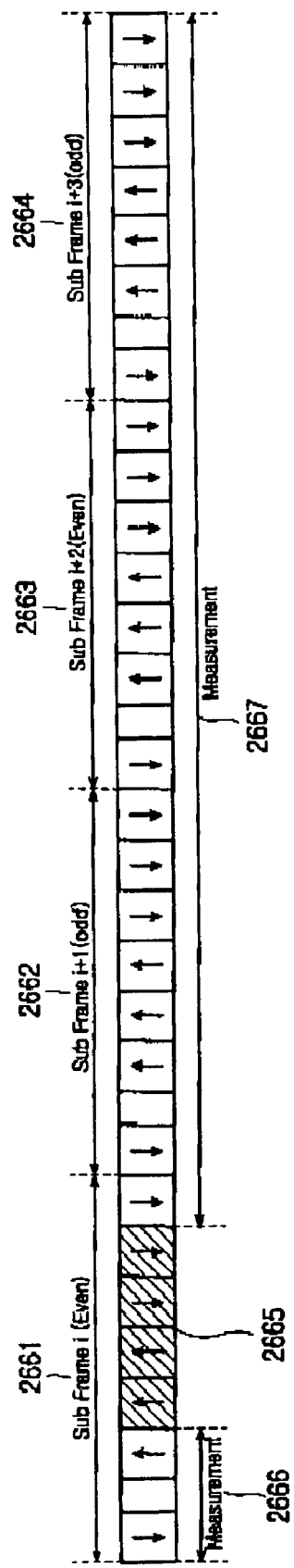

A method for extending a length of the MP introduced in an embodiment of the present invention based on the characteristics of the repetition period and the repetition length is illustrated in FIGS. 26B, 26C and 26D. For a better understanding of the MP introduced in FIGS. 26B, 26C and 26D, reference will first be made to MP of a UE using the channel structure of FIG. 26A.

Referring to FIG. 26A, uplink/downlink time slots of a UE are concentrated on a switching point according to an embodiment of the present invention, and periods where the UE can perform inter-frequency or inter-RAT measurement include a measurement period 2609 of a subframe 2601, a measurement period 2610 of the subframe 2601 and a subframe 2602, a measurement period 2611 of the subframe 2602 and a subframe 2603, a measurement period 2612 of the subframe 2603 and a subframe 2604, and a measurement period 2613 of the subframe 2604. In the channel structure of FIG. 26A, it is difficult for the UE to have a long measurement period of over 10 ms. If the measurement period is longer than 10 ms, the UE has greater measurement accuracy and greater measurement reliability. Therefore, the present invention provides a method for extending a measurement period of the UE depending on the above-stated repetition period and repetition length with reference to FIGS. 26B, 26C and 26D.

In FIGS. 26B, 26C and 26D, it will be assumed that a repetition period of a UE is 20 ms. However, the present invention can be equally applied to 40 ms, 80 ms, 160 ms, 320 ms and 640 ms repetition periods as well as the 20 ms repetition period. Further, the present invention can be applied even to other TDD systems using a concept similar to the repetition period. In addition, it will be assumed that the structure of FIG. 26A was conventionally used before the structure of FIGS. 26B, 26C and 26D is used as the uplink/downlink transmission structure of a UE.

A UE which was performing uplink/downlink communications with a Node B and inter-frequency measurement or inter-RAT measurement with the structure of FIG. 26A, performs uplink/downlink communications with the Node B using uplink/downlink time slots 2625 of a subframe 2621 and uplink/downlink time slots 2626 of a subframe 2622 in FIG. 26B, and performs inter-frequency measurement or inter-RAT measurement using a measurement period 2627 of a subframe 2621, a measurement period 2628 of a subframes 2621 and 2622, and a measurement period 2629 of the subframe 2622, a subframe 2623 and a subframe 2624. The measurement period 2629 of FIG. 26B has a length of over 10 ms, and considering a structure of consecutive frames, it can be connected to the measurement period 2627, thus extending a length of the measurement period. The measurement period 2629 is made by changing uplink/downlink time slots of the UE, which were repeated with a 10 ms repetition period and a 10 ms repetition length in FIG. 26A, to a 20 ms repetition period and a 10 ms repetition length, and then gathering uplink/downlink time slots used by the UE in FIG. 26A into one of two frames within the 20 ms repetition period.

The method of FIG. 26B provides the UE with a longer measurement period by changing only a repetition period while maintaining the number of channel resources, or channelization codes, for uplink/downlink time slots used by the UE in FIG. 26A. In the case of FIG. 26B, a repetition period is 20 ms and a repetition length is 10 ms. Therefore, in order to transmit the same information, information which was conventionally transmitted for 20 ms must be transmitted for one repetition length within one repetition period, and unlike the method of FIG. 26A for using one time slot for each of uplink/downlink transmissions for one repetition length, the method of FIG. 26B can transmit the same amount of information by using two time slots for each of uplink/downlink transmissions for one repetition length.

The method of FIG. 26C extends a measurement length of the UE by combining the method of changing a repetition period, introduced in FIG. 26B, and a method of changing a data rate of uplink/downlink channels assigned to the UE. In the case of FIG. 26C, a repetition period is 20 ms and a repetition length is 10 ms, in the same way as described in FIG. 26B.

In FIG. 26C, uplink/downlink time slots 2645 of a subframe 2641 and uplink/downlink time slots 2646 of a subframe 2642 represent uplink/downlink time slots 2605, uplink/downlink time slots 2606, uplink/downlink time slots 2607, and uplink/downlink time slots 2608 used for uplink/downlink transmissions by the UE in FIG. 26A, and uplink/downlink data rates used by the UE at the time slots 2645 and 2646 are two times greater than uplink/downlink data rates used by the UE in FIG. 26A. In FIG. 26C, the number of time slots occupied by the UE can be changed according to a data rate used by the UE for uplink/downlink transmissions.

As a method of increasing the data rate, there is a method of increasing the number of channelization codes used within one time slot. That is, unlike the conventional method of using one channelization code within one time slot, the novel method may use two channelization codes within one time slot in order to double the data rate.

As another method of increasing the data rate, there is a method of decreasing a spreading factor while fixing the number of channelization codes used within one time slot. That is, it is possible to double a data rate by using one channelization code for uplink transmission within one time slot in the conventional method and changing a spreading factor of a channelization code from 16 to 8.

In FIG. 26C, the UE can use a measurement period 2647, a measurement period 2648, and a measurement period 2649 for inter-frequency measurement or inter-RAT measurement, and considering transmission of consecutive frames, the UE can use the measurement period 2649 together with the measurement period 2647 for inter-frequency measurement or inter-RAT measurement.

The method of FIG. 26D is to gather uplink/downlink time slots of a UE, which were scattered over two subframes, into one subframe. In the method of FIG. 26D, a UE that intends to perform inter-frequency measurement or inter-RAT measurement can use a measurement period 2666 of a subframe 2661 and a measurement period 2667 over the subframe 2661, a subframe 2662, a subframe 2663, and a subframe 2664. Uplink/downlink time slots 2665 can be used for uplink/downlink transmissions. In FIG. 26D, a measurement period is longer than 15 ms, and if the measurement period is used for inter-frequency measurement or inter-RAT measurement, the UE can acquire more accurate measurement results. In the method of FIG. 26D, if it is possible to change uplink/downlink data rates used by the UE in FIG. 26C, the UE can have a longer measurement period. FIG. 26D shows an example of MP having a 20 ms repetition period and a 5 ms repetition length.

The methods of making MP, introduced in FIGS. 26B, 26C and 26D, are exemplary methods for extending a measurement period by changing a repetition period and a repetition length. In addition, the methods are exemplary methods for making a longer measurement period by changing uplink/downlink data rates of a UE.

Now, a description will be made of an upper layer signaling process for supporting the MP extension method through a change in a repetition period and a repetition length, proposed in FIGS. 26A to 26D.

In order to convert a format of a channel assigned to a UE, the standard specification proposes several messages to be used in a channel conversion process. Such messages include "Radio Bearer setup," "Radio Bearer reconfiguration," "Transport Channel reconfiguration," "Physical Channel reconfiguration" messages. Such messages include information on uplink/downlink dedicated channels, illustrated in Table 1 and Table 2.

TABLE 1

| Common timeslot info | |
| --- | --- |
| Repetition period | integer (1, 2, 4, 8, 16, 32, 64) |
| Repetition length | integer (1, . . . , Repetition period −1) |
| Downlink DPCH timeslots and codes | |
| First individual timeslot info | timeslot number (0, . . . , 6) |
| First timeslot channelisation codes | bitmap or (first and last channelisation |
| Consecutive timeslots | |

TABLE 2

| Common timeslot info | |
| --- | --- |
| Repetition period | integer (1, 2, 4, 8, 16, 32, 64) |
| Repetition length | integer (1, . . . , Repetition period −1) |
| Downlink DPCH timeslots and codes | |
| First individual timeslot info | timeslot number (0, . . . , 6) |
| First timeslot code lists | enumerated (1/1, 1/2, 2/2, 1/4 . . . 4/4, 1/8 . . . 8/8, 1/16 . . . 16/16) |
| Consecutive timeslots | |

It is possible to determine a format of a channel assigned or reassigned to a UE through combination of the dedicated channel information given in Table 1 and Table 2.

For example, in order to assign a channel with the format of FIG. 26A to a UE, the dedicated channel information given in Table 1 and Table 2 is given as illustrated in Table 3.

TABLE 3

| Downlink | |
| --- | --- |
| Repetition period | 1 |
| First individual timeslot info | 4 |
| Forward link | |
| Repetition period | 1 |
| First individual timeslot info | 3 |

Here, if both the uplink and downlink dedicated channels have a 10 ms repetition period, a repetition length becomes 10 ms necessarily. According to the current standard specification, if a repetition period is 10 ms, it is not necessary to represent a repetition length. Codes assigned to downlink and uplink dedicated channels are used for one of a time slot #3 and a time slot #4, and this is not illustrated in Tables stated above.

In order to convert a channel assigned in the manner described in conjunction with FIG. 26A to the channel format of FIG. 26B, it is necessary to transmit a message including information illustrated in Table 4. In this case, the types of available messages are "Radio Bearer reconfiguration," "Transport Channel reconfiguration," and "Physical Channel reconfiguration" messages.

TABLE 4

| Downlink | |
|---|---|
| Repetition period | 2 |
| Repetition length | 1 |
| First individual timeslot info | 4 |
| Consecutive timeslots | 5 |
| Forward link | |
| Repetition period | 2 |
| Repetition length | 1 |
| First individual timeslot info | 2 |
| Consecutive timeslots | 3 |

In Table 4, information on Consecutive timeslots can be provided in several ways. However, for the convenience of explanation, it will be assumed that the information on Consecutive timeslots is provided by simply notifying a unique number of an added time slot.

Even in the case of FIG. 26C, information similar to that of Table 4 can be provided. However, since one time slot is assigned to each of downlink and uplink dedicated channels, the information on Consecutive timeslots is excluded.

In the case of FIG. 26D, however, the current standard specification has no way to provide necessary information. In the case of FIG. 26D, the repetition length is not a 10 ms frame unit but a 5 ms subframe unit. Even in this case, it is possible to provided information on a channel assignment type through a repetition period and a repetition length in the above-described manner. However, the values of the repetition period and the repetition length must be different from the current values. That is, the current repetition period can have a value of 1, 2, 4, 8, 16, 32 and 64, and this corresponds to the number of 10 ms frames. However, when channels are assigned in a subframe unit as illustrated in FIG. 26D, a repetition period must be defined as an integer ranging from 1 to 128, and each value must be redefined so that it should correspond to the number of subframes. In addition, a repetition length, though it also originally corresponds to the number of 10 ms frames, must be redefined as a value corresponding to the number of 5 ms subframes.

Based on this, the information on the downlink and uplink dedicated channels, given in Table 1 and Table 2, must be changed as illustrated in Table 5 and Table 6.

TABLE 5

| Common timeslot info | |
|---|---|
| Repetition period | integer (1, . . . , 128) |
| Repetition length | integer (1, . . . , Repetition period −1) |
| Downlink DPCH timeslots and codes | |
| First individual timeslot info | timeslot number (0, . . . , 6) |
| First timeslot channelisation codes | bitmap or (first and last channelisation code) |
| Consecutive timeslots | |

TABLE 6

| Common timeslot info | |
|---|---|
| Repetition period | integer (1, . . . , 128) |
| Repetition length | integer (1, . . . , Repetition period −1) |

TABLE 6-continued

| Downlink DPCH timeslots and codes | |
|---|---|
| First individual timeslot info | timeslot number (0, . . . , 6) |
| First timeslot code lists | enumerated (1/1, 1/2, 2/2, 1/4 . . . 4/4, 1/8 . . . 8/8, 1/16 . . . 16/16) |
| Consecutive timeslots | |

As illustrated in Table 5 and Table 6, a value of the repetition period is changed to an integer ranging from 1 to 128, and a definition of the repetition period and repetition length is changed so that they should correspond to the number of 5 ms subframes.

If dedicated channels are assigned or modified in the format illustrated in FIG. 26D by applying the changed definition, each information field has the value shown in Table 7.

TABLE 7

| Downlink | |
|---|---|
| Repetition period | 4 |
| Repetition length | 1 |
| First individual timeslot info | 4 |
| Consecutive timeslots | 5 |
| Forward link | |
| Repetition period | 4 |
| Repetition length | 1 |
| First individual timeslot info | 2 |
| Consecutive timeslots | 3 |

If channels are assigned or modified in the formats illustrated in FIGS. 26A and 26B based on the repetition period and repetition length redefined in Table 5 and Table 6, information of Table 3 and Table 4 must be changed as shown in Table 8 and Table 9.

TABLE 8

| Downlink | |
|---|---|
| Repetition period | 2 |
| Repetition length | 1 |
| First individual timeslot info | 4 |
| Forward link | |
| Repetition period | 2 |
| Repetition length | 1 |
| First individual timeslot info | 3 |

TABLE 9

| Downlink | |
|---|---|
| Repetition period | 4 |
| Repetition length | 2 |
| First individual timeslot info | 4 |
| Consecutive timeslots | 5 |
| Forward link | |
| Repetition period | 4 |
| Repetition length | 2 |
| First individual timeslot info | 2 |
| Consecutive timeslots | 3 |

In the case of FIG. 26B, the repetition period and repetition length are simply doubled. However, in the case of FIG. 26A, since the repetition period is changed to two subframes, it is necessary to specify that a repetition length corresponds to one subframe. Accordingly, although the existing definition does not need information on the repetition length, the modified definition requires information on the repetition length.

Figure 25:
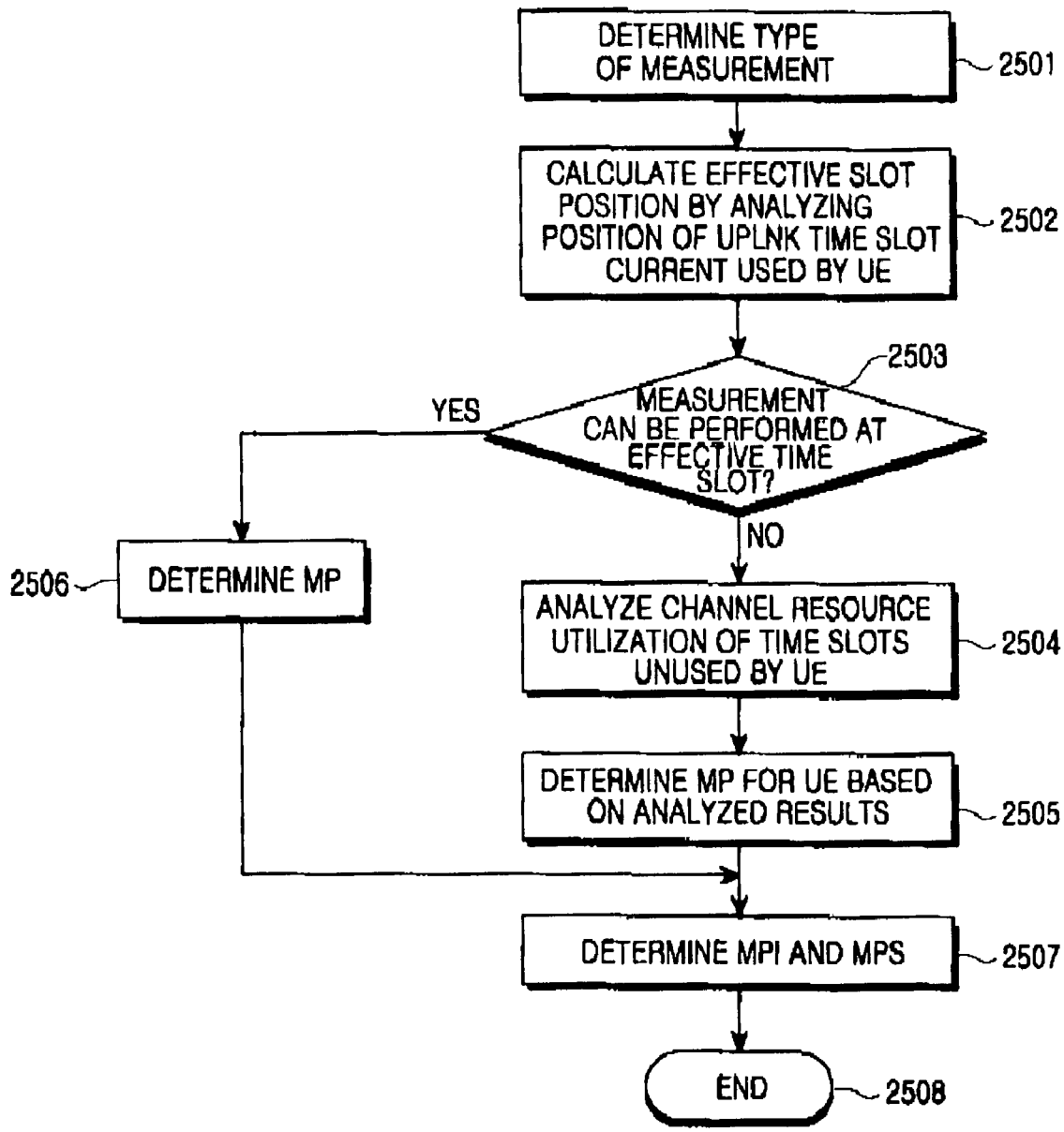
FIG. 25 illustrates a procedure for determining measurement parameters according to an embodiment of the present invention.

A procedure for making MP illustrated in FIGS. 7, 8, 9, 10, 22, 23, 24 and 26A–26D, and MPS using the MP is illustrated in FIG. 25.

Although the method of making MP and MPS, described in conjunction with FIG. 25, is applied to a case where an NB-TDD communication system measures a signal from another NB-TDD communication system using a different frequency band or an inter-RAT signal, the method can be applied to other communication systems supporting a time division duplexing (TDD) technique similar to the NB-TDD.

Referring to FIG. 25, in step 2501, SRNC determines the type of an item to be measured by UE. That is, the SRNC determines whether the UE performs inter-frequency measurement or inter-RAT measurement. In step 2502, the SRNC calculates positions of time slots currently unused by the UE. If it is determined in step 2501 that there are several items to be measured by the UE (i.e., inter-frequency measurement and inter-RAT measurement with GSM or FDD), the SRNC determines to perform the corresponding measurement. Alternatively, the SRNC may determine to sequentially perform the inter-RAT measurement.

In step 2503, the SRNC determines whether the measurement items determined in step 2501 can be measured for the unused time slot period calculated in step 2502. If the measurement items determined in step 2501 can be measured for the time slot period calculated in step 2502, the SRNC determines, in step 2506, MP based on the unused time slot period calculated in step 2502. If it is determined in step 2503 that the measurement item determined in step 2501 cannot be measured for the time slot period currently unused by the UE, then the SRNC analyzes, in step 2504, utilization conditions of channel resources for the time slots unused by the UE.

In step 2505, the SRNC determines MP to be used for the UE based on analysis results acquired in step 2504. The MP is determined according to the characteristics of the measurement items determined in step 2501. If the number of measurement items determined in step 2501 is a plural number, the SRNC determines the MPs for the individual measurement items. The MPs for the individual measurement items may be applied either simultaneously or sequentially. A length of the MP can be defined as a length of a subframe, a frame, or several frames, as illustrated in FIGS. 7, 8, 9, 10, 22, 23, 24 and 26A–26D.

In step 2507, the SRNC determines MPS depending on the MP determined in step 2506 or 2505, and MPI indicating an interval between the MPs. A plurality of MPs and MPIs can be defined in the MPS.

After determining the MPS in step 2507, the SRNC ends an MP and MPS decision algorithm in step 2508.

The MPS determined through the procedure of FIG. 25 is provided to a UE after the MPSP and MPSRN are determined, so that the UE can perform inter-frequency measurement or inter-RAT measurement.

The MPSRN is determined such that reliable measurements can be performed or satisfactory measurement results can be obtained using the MPS. A UE reports the measurement results at an MPSRN ending point. Alternatively, if the measurement results are satisfactory even before the MPSRM ending point, the UE may report the measurement results.

The present invention provides another exemplary method for performing inter-RAT measurement by a UE. In this method, the UE interrupts transmission within a subframe or frame period through a data transmission scheduling method of an upper layer. The method of making MP and MPS, described in conjunction with FIG. 25, is applied to the case where a UE that intends to perform inter-frequency measurement or inter-RAT measurement monitors a signal from a communication system using a different frequency or supporting a different communication technique in a period where the UE does not communicate with a Node B. For the inter-frequency measurement or inter-RAT measurement, the UE must perform measurement through a period of idle time slots except a currently used slot, or channel reassignment. However, during high-speed data transmission/reception, the UE cannot perform correct measurement in the idle time slot period except the currently used time slot. Alternatively, since the UE performs high-speed data transmission/reception, time slots that can be reassigned to channels are insufficient. Therefore, in this case, the UE can perform the inter-frequency measurement or inter-RAT measurement using the method of interrupting data transmission/reception in a subframe or frame period. The transmission/reception interruption method can also be used as another pattern similar to the MP determined through the procedure of FIG. 25.

FIGS. 11, 13, 14, 15, 16, 17 and 18 illustrate operations of a Node B and a UE, and an upper layer signaling procedure according to an embodiment of the present invention. For the convenience of explanation of FIGS. 11, 13, 14, 15, 16, 17 and 18, a description will be made of each element for a communication network commonly used in a 3GPP communication system. The 3GPP communication network includes UTRAN (UMTS Terrestrial Radio Access Network) and UE. The UTRAN includes a plurality of RNCs (Radio Network Controllers) and a plurality of Node Bs controlled by the RNCs. The RNC is divided into SRNC (Serving RNC) and DRNC (Drift RNC) according to the relationship with the UE. The SRNC is an RNC where the UE is registered, and the DRNC is an RNC which manages a Node B which currently communicates with the UE. The SRNC and the DRNC may be either identical to or different from each other.

With reference to FIGS. 11, 13, 14, 15, 16, 17 and 18, a description will be made of signaling performed among SRNC, Node B and UE, and a change in a physical channel required accordingly, when the SRNC of an NB-TDD system recognizes that the UE is required to perform inter-RAT measurement.

Further, in FIGS. 11, 13, 14, 15, 16, 17 and 18, the present invention provides a method for previously determining radio resources corresponding to DL time slots and UL time slots to which the above-stated UP and MPS can be applied, and reserving the determined radio resources so that a UE can use the reserved radio resources for inter-RAT measurement, if necessary.

The method for reserving radio resources so that the UE can use the reserved radio resources for inter-RAT measurement, when necessary, will be described herein below. For realization of a channel assignment change method for extension of the inter-RAT measurement period, time slot resources to which DL or UL channels favorable for inter-RAT measurement are assigned to a UE which is required to perform the inter-RAT measurement, and not assigned to other UEs except the UE that is required to perform the inter-frequency measurement or inter-RAT measurement. Referring to FIG. 8, if a switching point exists between a fourth time slot and a fifth time slot, radio resources corresponding to the fourth time slot, i.e., N UL channelization codes, and radio resources corresponding to the fifth time slot, i.e., M DL channelization codes, are reserved as radio resources for the inter-frequency measurement or inter-RAT measurement. Time slots that can be reversed as radio resources for the inter-frequency measurement or inter-RAT measurement may become a UL time slot and a DL time slot existing on both sides of a given switching point. The foregoing description is equal to the description previously made with reference to FIGS. 7, 8, 9, 10, 22, 23, 24 and 26A–26D. In the NB-TDD, DL channels use two channelization codes with SF=1 and SF=16, and UL channels use 5 channelization codes with SF=1, SF=2, SF=4, SF=8 and SF=16, so SF=16 channelization codes are reversed as N UL resources and M DL resources. According to the present invention, a Node B and a UE where were performing transmission/reception using DL and UL time slots which were assigned at an initial call request, are reassigned one of the reversed time slots when necessary to perform inter-RAT measurement, and continuously perform communication. As a result, an inter-RAT measurement period is extended, contributing to an increase in inter-RAT measurement performance.

Figure 11:
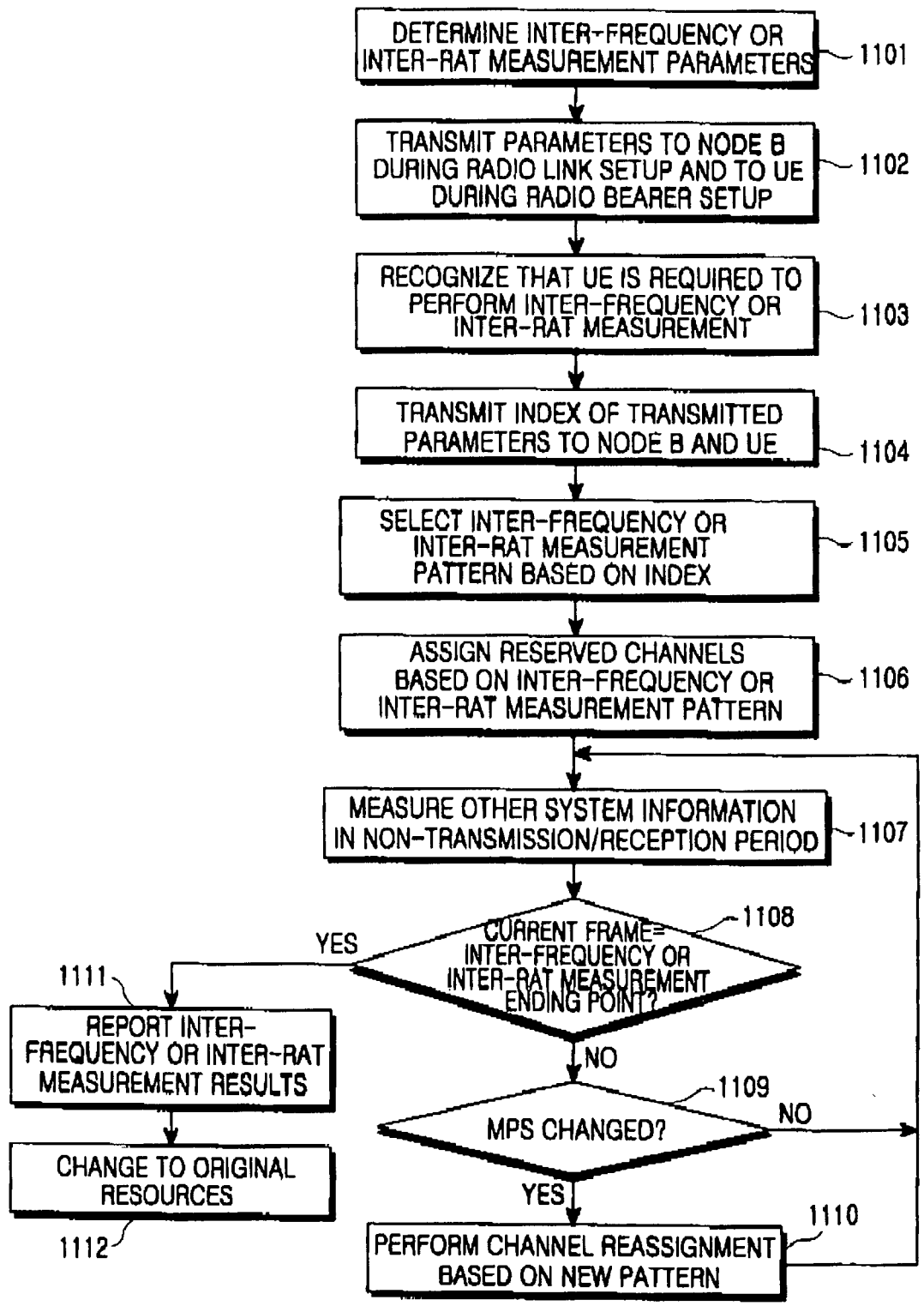
FIG. 11 illustrates a procedure for searching a target Node B in a handover state in an NB-TDD mobile communication system according to an embodiment of the present invention.

FIG. 11 illustrates operations of a Node B and a UE according to an embodiment of the present invention. When the UE performs inter-frequency measurement or inter-RAT measurement, the Node B previously defines several MPSs, and transmits information on the defined MPSs to the UE. Thereafter, when the inter-frequency measurement or inter-RAT measurement must be performed, the Node B transmits an index for the MPS information to the UE, so that the UE can perform inter-frequency measurement or inter-RAT measurement using MPS corresponding to the index information. In addition to the method for previously defining several MPSs and transmitting MPS to a UE using index information corresponding thereto, there is another method for transmitting information necessary for MPS at each measurement point, to a UE that is required to perform inter-frequency measurement or inter-RAT measurement.

In FIG. 11, as a UE starts communication with an NB-TDD system, an SRNC provides pattern information for inter-frequency measurement or inter-RAT measurement to the UE and a Node B connected to the UE. That is, the SRNC provides information on the above-defined MP, MPI and MPS. Since the MPSP is information indicating a starting point of the inter-frequency measurement or inter-RAT measurement, this information is provided before the starting point of the inter-frequency measurement or inter-RAT measurement. The MPSRN is information which may be previously provided together with MP, MPI and MPS, for each measurement item. Further, the MPSRN is determined together with the MPSP for each measurement item, and may be provided immediately before a measurement starting point.

The MPI is an interval where the UE does not perform the inter-frequency measurement or inter-RAT measurement. In the MPI period, the UE performs uplink/downlink communications using the originally used time slots and channelization orthogonal codes. By using the time slots and channelization orthogonal codes originally used by the UE for the MIP period, it is possible to reserve several channelization orthogonal codes within a specific time slot in a subframe in order to provide a longer measurement period to the UE that intends to perform inter-frequency measurement or inter-RAT measurement. Since the UE uses the time slots and channelization orthogonal codes used before inter-frequency measurement or inter-RAT measurement for the MIP period, other UEs that perform inter-frequency or inter-RAT measurement can use again the time slots and channelization orthogonal codes used by the UE during inter-frequency measurement or inter-RAT measurement. Therefore, the UEs can also use a longer measurement period. In step 1101 of FIG. 11, the SRNC determines pattern information parameters for the inter-frequency measurement or inter-RAT measurement. The pattern information can be determined using the method described in conjunction with FIG. 25. In step 1102, the SRNC transmits the parameters determined in step 1101 to the Node B during radio link setup, and transmits the parameters to the UE during radio bearer setup. The "radio link setup" refers to a physical communication path between SRNC and Node B, and the "radio bearer setup" refers to a logical or physical communication path between SRNC and UE.

Since the parameters related to the inter-frequency measurement or inter-RAT measurement are transmitted to the Node B and the UE in step 1102, the Node B and the UE have all pattern information available for the inter-frequency measurement or inter-RAT measurement. Next, after recognizing in step 1103 that the UE is required to perform the inter-RAT measurement, the SRNC transmits, in step 1104, only MPSRN to the Node B and the UE, if MPSRN is not included in an index corresponding to the parameters previously transmitted to the Node B and the UE, MPSP, and the parameters transmitted in step 1102. In step 1105, the Node B and the UE determine whether they will use an inter-frequency measurement pattern or an inter-RAT measurement pattern, based on only the index transmitted by the SRNC. After determining the inter-frequency measurement pattern or the inter-RAT measurement pattern, the Node B and the UE are reassigned channels reserved for the inter-frequency measurement or inter-RAT measurement in the pattern on the channel currently in use by a channel reassignment method of each pattern, and continues communication using the reassigned channels. In step 1107, the UE performs the inter-frequency measurement or inter-RAT measurement at non-transmission time slots except the reassigned channels. Since MPS for the inter-frequency measurement or inter-RAT measurement has a length of several frames, the UE and the Node B determine in step 1108 whether the current frame is an inter-frequency or inter-RAT measurement ending point, by comparing the MPS with MPSRN. If the current frame is an ending point, the UE ends, in step 1111, the inter-frequency measurement or inter-RAT measurement and reports the measurement results. Thereafter, in step 1112, the UE and the Node B continue communication using the uplink/downlink time slots that were used before the inter-frequency measurement or inter-RAT measurement is started. However, if the current frame is not an ending point, the UE determines in step 1109 whether MPS to be used for the next measurement is identical to the current MPS. If the MPS to be used for the next measurement is different from the current MPS, the UE performs channel reassignment again according to a channel reassignment method of the MPS in step 1110, and then returns to step 1107.

Although the description of FIG. 11 has been made on the assumption that the UE performs only one measurement, the procedure of FIG. 11 can be applied even to the case where the UE performs several measurements in parallel or series. Further, in the description of FIG. 11, parameters to be used for the measurement are previously defined and index information corresponding to the parameters is used. However, the parameters to be used for the measurement may be provided from an external device. In this case, the steps 1102 and 1105 are excluded, and in step 1104, the SRNC transmits the parameters instead of the index corresponding to the parameters.

The inter-frequency or inter-RAT measurement procedure described in conjunction with FIG. 11 will be described again with reference to FIG. 12 on the assumption of actual communication conditions. It is assumed in FIG. 12 that two kinds of MP are used, and the MP has a 1-radio frame length.

Figure 12:
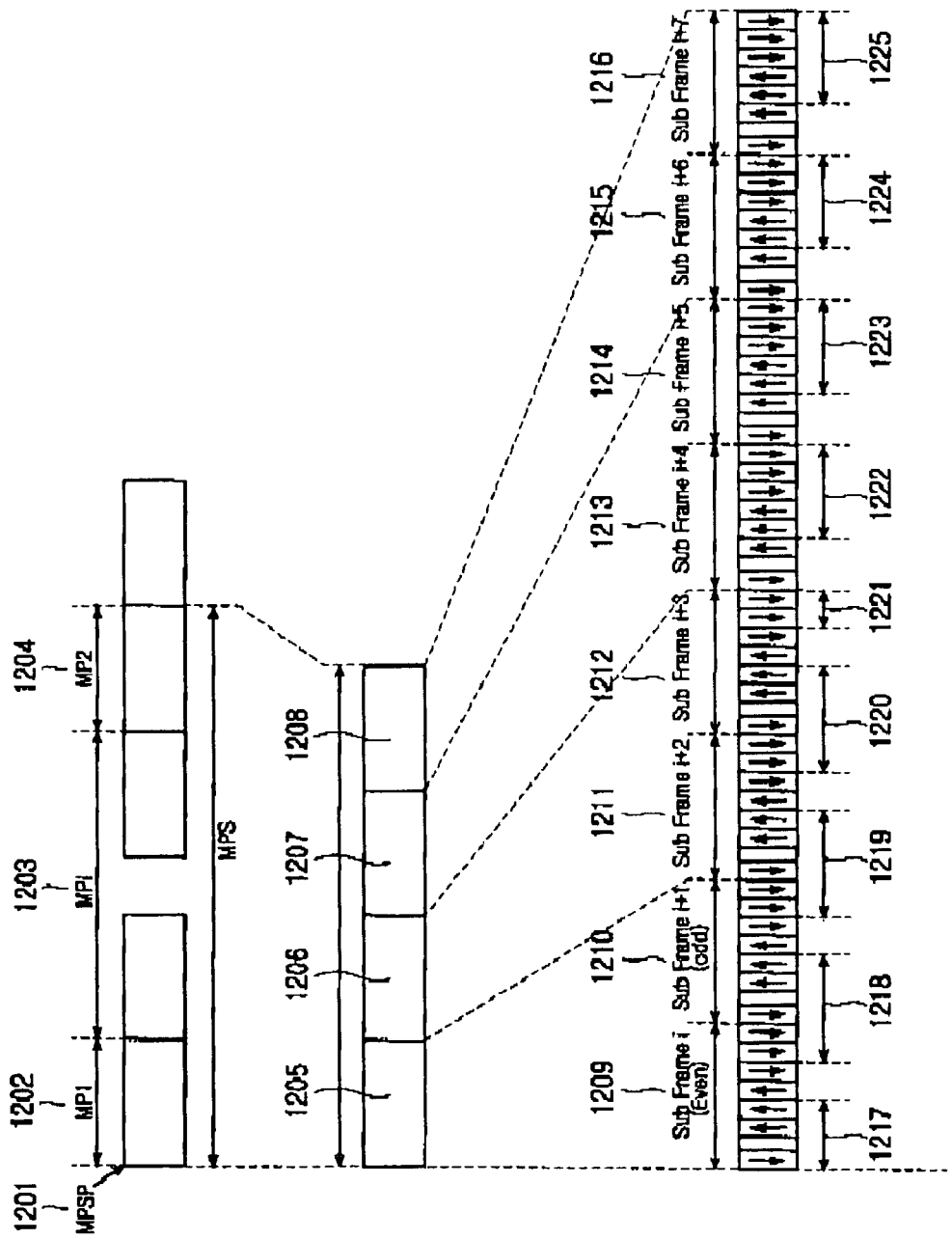
FIG. 12 illustrates an exemplary pattern for searching a target Node B in a handover state in an NB-TDD mobile communication system according to an embodiment of the present invention.

FIG. 12 illustrates a series of frames transmitted between a UE and a Node B. In the series of frames, inter-RAT measurement is performed for a period 1202 and a period 1204. It will be assumed that the period continues over MP1 1202 from MPSP 1201, and continues again over MP2 1024 after MP1 1203. The MP1 or MP2 includes frames for inter-RAT measurement. Inter-frequency or inter-RAT measurement patterns constituting the MP1 and MP2 may be either identical or different. In addition, the MP1 may have a value of 0. That is, the MP1 and MP2 may exist consecutively. The MP1 1202, MPI 1203 and MP2 1204 constitute one MPS. The MPS may be repeated M times, and the repetition is represented by MPSRN. If the MPSRN expires, the inter-RAT measurement is ended, and the UE reports the measurement results to the SRNC. In FIG. 12, MP1 1202 and MP2 1204 are applied to a radio frame 1205, a radio frame 1206, a radio frame 1207, and a radio frame 1208. Each of the inter-RAT measurement frames to which the MPs are applied, uses a channel assignment method favorable for the inter-RAT measurement. That is, in the MP1 and MP2, the channel assignment method is changed as described in conjunction with FIGS. 7, 8, 9, 10, 22, 23, 24 and 26A–26D.

Figure 1A:
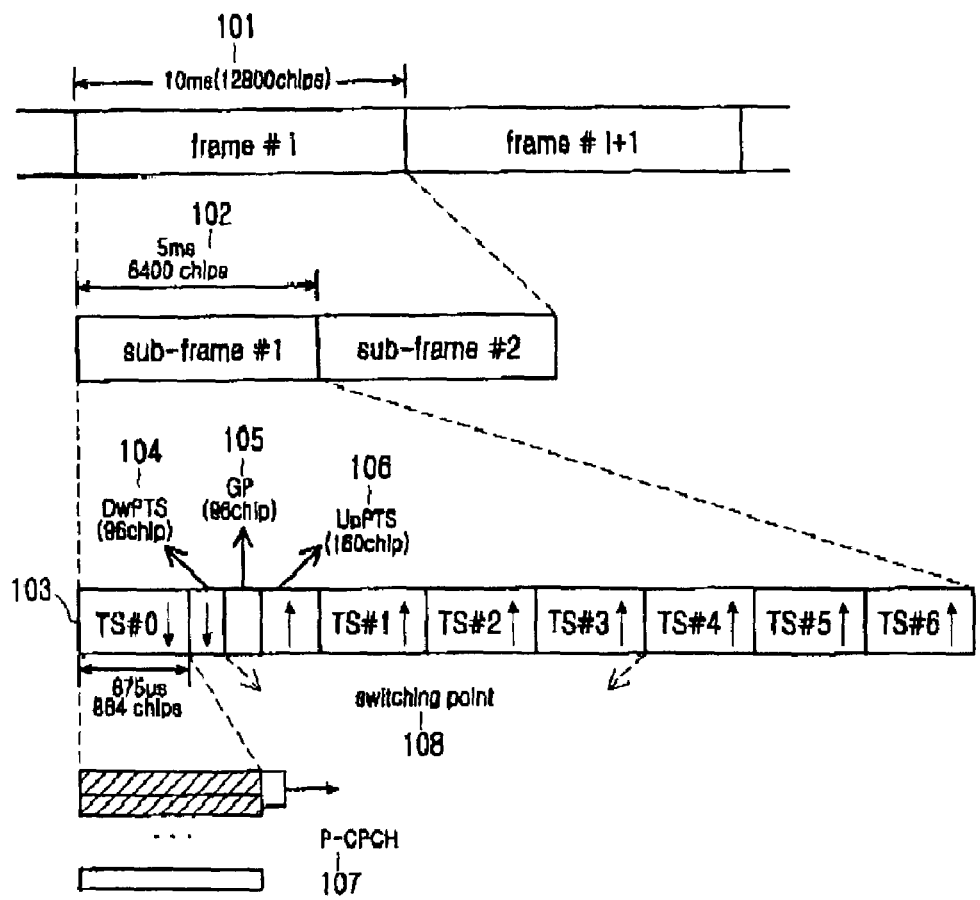
FIGS. 1A and 1B illustrate channel structures in a common NB-TDD mobile communication system.
Figure 1B:
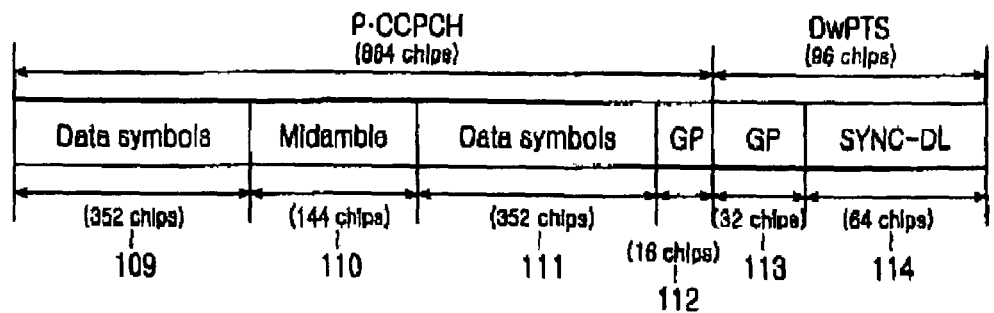
Figure 2A:
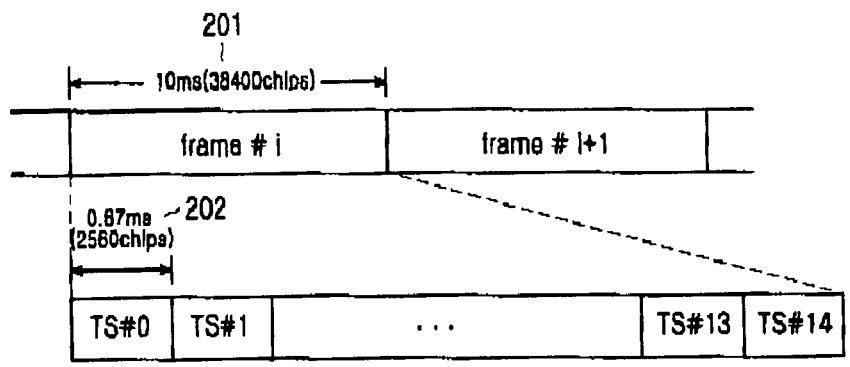
FIGS. 2A to 2C illustrate channel structures in a common WB-TDD mobile communication system.
Figure 2B:
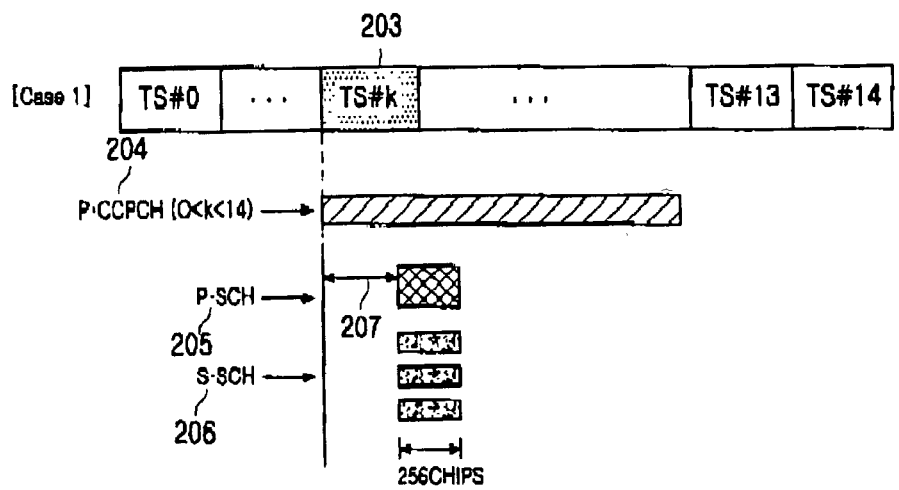
Figure 2C:
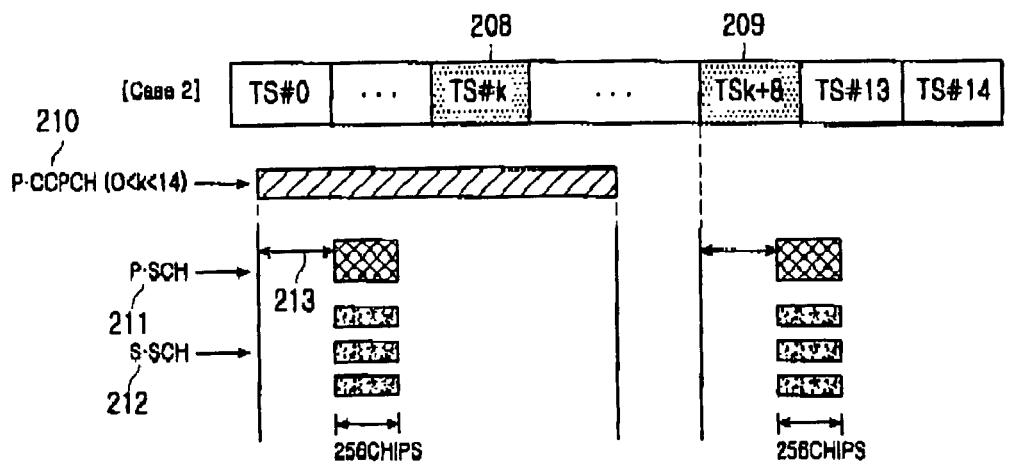
Figure 3A:
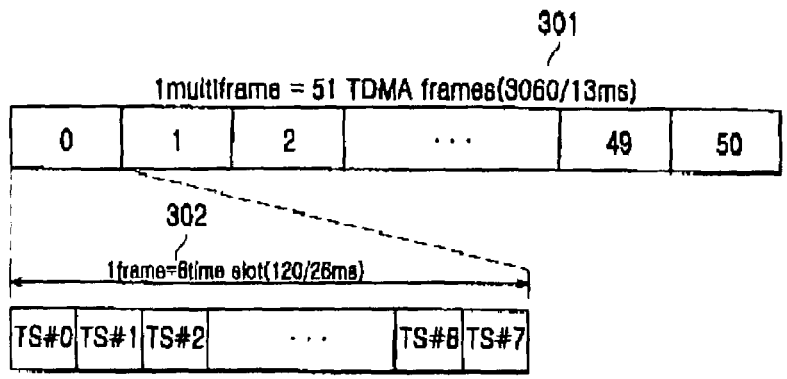
FIGS. 3A to 3C illustrate channel structures in a common GSM mobile communication system.
Figure 3B:
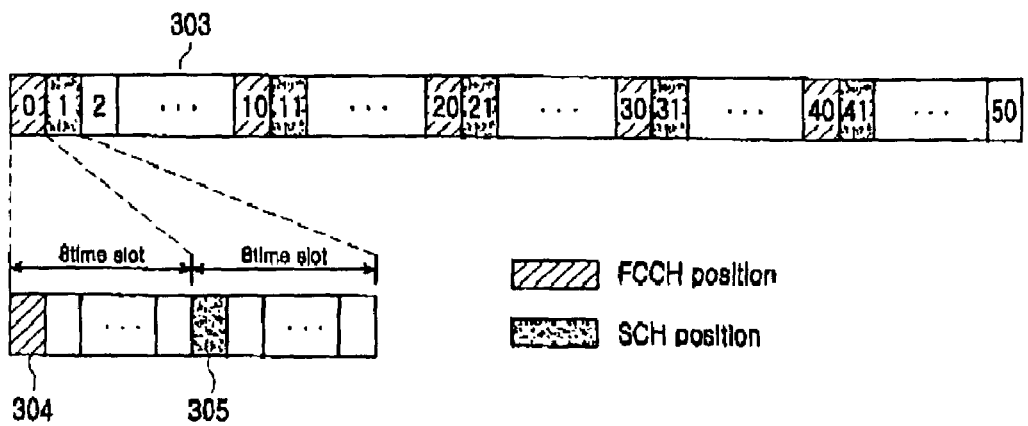
Figure 3C:
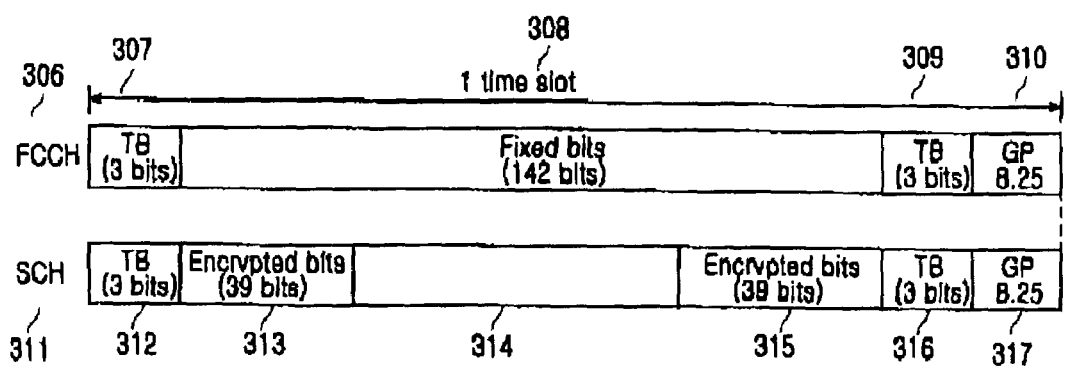
Figure 4:
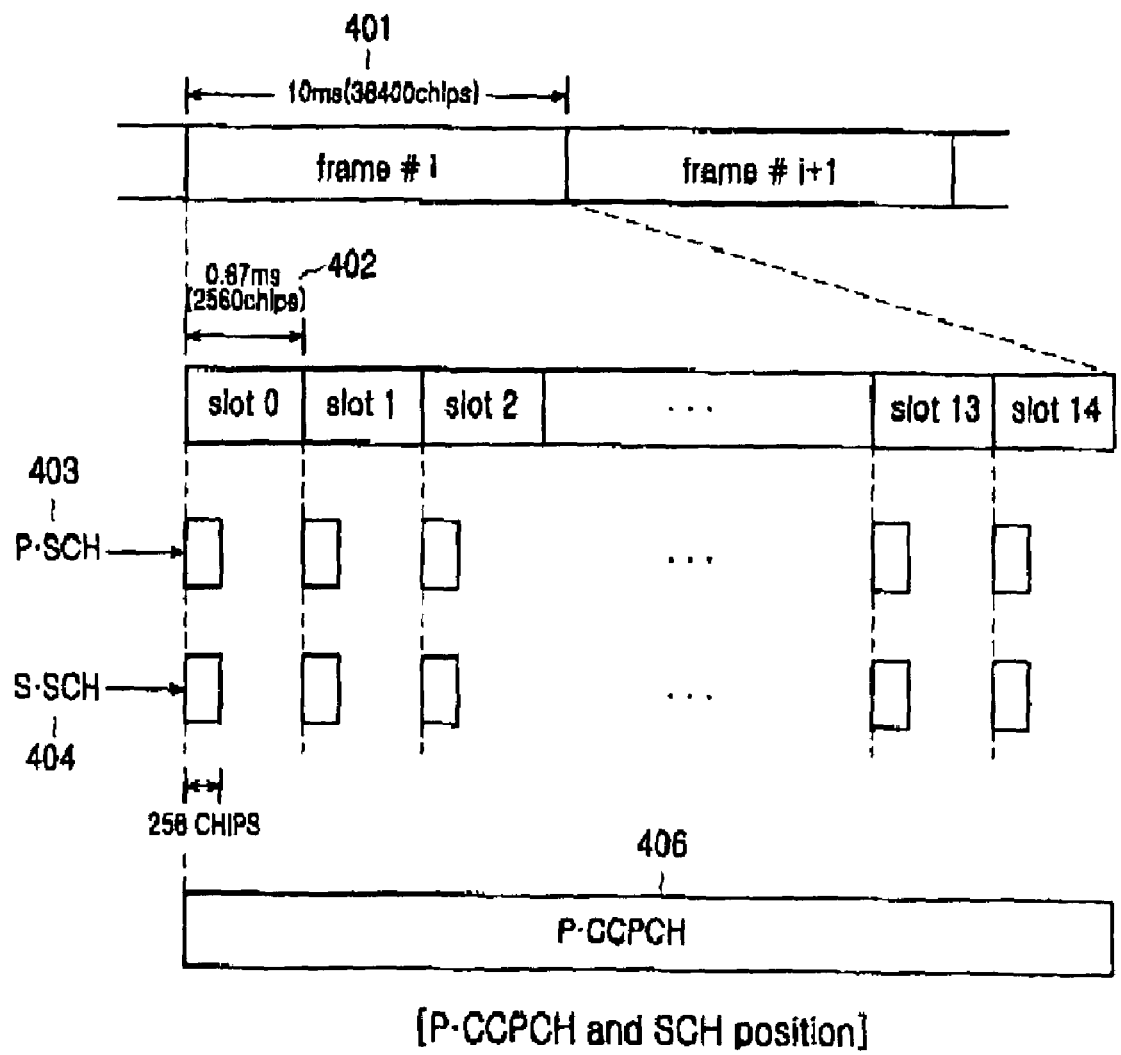
FIG. 4 illustrates a channel structure in a common FDD mobile communication system.

Although it is assumed in FIG. 12 that the MP1 1202 and the MP2 1204 use different patterns, the MP1 1202 and the MP2 1204 may use the same pattern. However, if the same pattern is used for the MP1 1202 and the MP2 1204, an NB-TDD communication system has no difficulty in performing measurement since P-CCPCH and DwPTS, P-CCPCH and SCH, and SCH and FCCH are transmitted over specific time slots in monitoring an NB-TDD system of FIG. 1, a WB-TDD system of FIG. 2, an SGM system of FIG. 3. However, in the case of an FDD system described in conjunction with FIG. 4, P-SCH is can be measured even though it is applied to the same MP, but S-SCH and P-CCPCH may not be measured if they are applied to the same MP. In the case of the S-SCH, since every slot transmits a different code, every slot must be monitored. Likewise, the P-CCPCH is also transmitted over every slot, all slots in one frame must be monitored. In addition, since the monitoring must be performed for 20 ms in order to read BCH information transmitted over the P-CCPHC. Therefore, if only one pattern is repeatedly used, a specific period may not be read each time, making it impossible to correctly perform the inter-frequency measurement or inter-RAT measurement. Therefore, the present invention provides a method of applying different patterns to MP according to a purpose of the inter-RAT measurement.

FIG. 12 illustrates an exemplary method of using two kinds of pattern. In FIG. 12, a frame 1205 uses one pattern comprised of a subframe 1209 and a subframe 1210. This pattern is an example of the channel reassignment method for extending an inter-frequency or inter-RAT measurement period, described in conjunction with FIG. 7. In the subframe 1209, a fourth time slot is assigned as a UL channel and a fifth time slot is assigned as a DL channel. In the subframe 1210, a fourth time slot is assigned as a UL channel and a fifth time slot is assigned as a DL channel.

Therefore, in the frame 1205, an inter-frequency or inter-RAT measurement period includes a period 1217 of a first time slot to a third time slot of the subframe 1209, a period 1218 of a sixth time slot of the subframe 1209 to a third time slot of the subframe 1210, and the last two time slots of the subframe 1210. The last two time slots of the subframe 1210 are connected to a first time slot to a third time slot of a subframe 1211 of the next frame 1206, forming an inter-frequency or inter-RAT measurement period 1219. In the embodiment of the present invention, the intact pattern of FIG. 7 used in the first frame 1205 is used even for the second frame 1206. However, the pattern described in conjunction with FIG. 8 is used beginning at a third frame 1207. In a first subframe 1213, a first time slot is assigned as a DL channel and a second time slot is assigned as a UL channel, and in a second subframe 1214, a first time slot is assigned as a DL channel and a second time slot is assigned as a UL time slot, based on the channel assignment method described in conjunction with FIG. 8. Therefore, a measurement period of the frame 1207 includes a period 1222 of a third time slot to the last time slot of the subframe 1213, and a period 1223 of a third time slot to the last time slot of the subframe 1214. Even in the next frame 1208, the channel assignment method of FIG. 8 is repeated. Shown in FIG. 12 is the simplest example using various MPs, and the number of MPs can be increased.

Next, a description will be made of a signaling method among Node B, UE and SRNC, performed to realize the above-stated channel assignment method.

For inter-frequency measurement or inter-RAT measurement using the above-stated pattern, the pattern information must be transmitted from SRNC to Node B and UE, when a call is set up between the UE and the Node B, i.e., when a radio link and a radio bearer are set up between the UE and the Node B. The pattern information include information on a channel reassignment method of each pattern indicated by MP, MPI, MPS, MPSP and MPSRN, information on a possible combination of patterns, and information on a starting point and an ending point of inter-frequency or inter-RAT measurement. The channel reassignment method is a method determined in accordance with the procedure of FIG. 25, and examples of the channel reassignment method are illustrated in FIGS. 7, 8, 9, 10, 22, 23, 24 and 26A–26D. As described above, the inter-RAT measurement parameters are provided by previously defining several parameters and then transmitting either an index corresponding to the defined parameters or the defined parameters.

Figure 13:
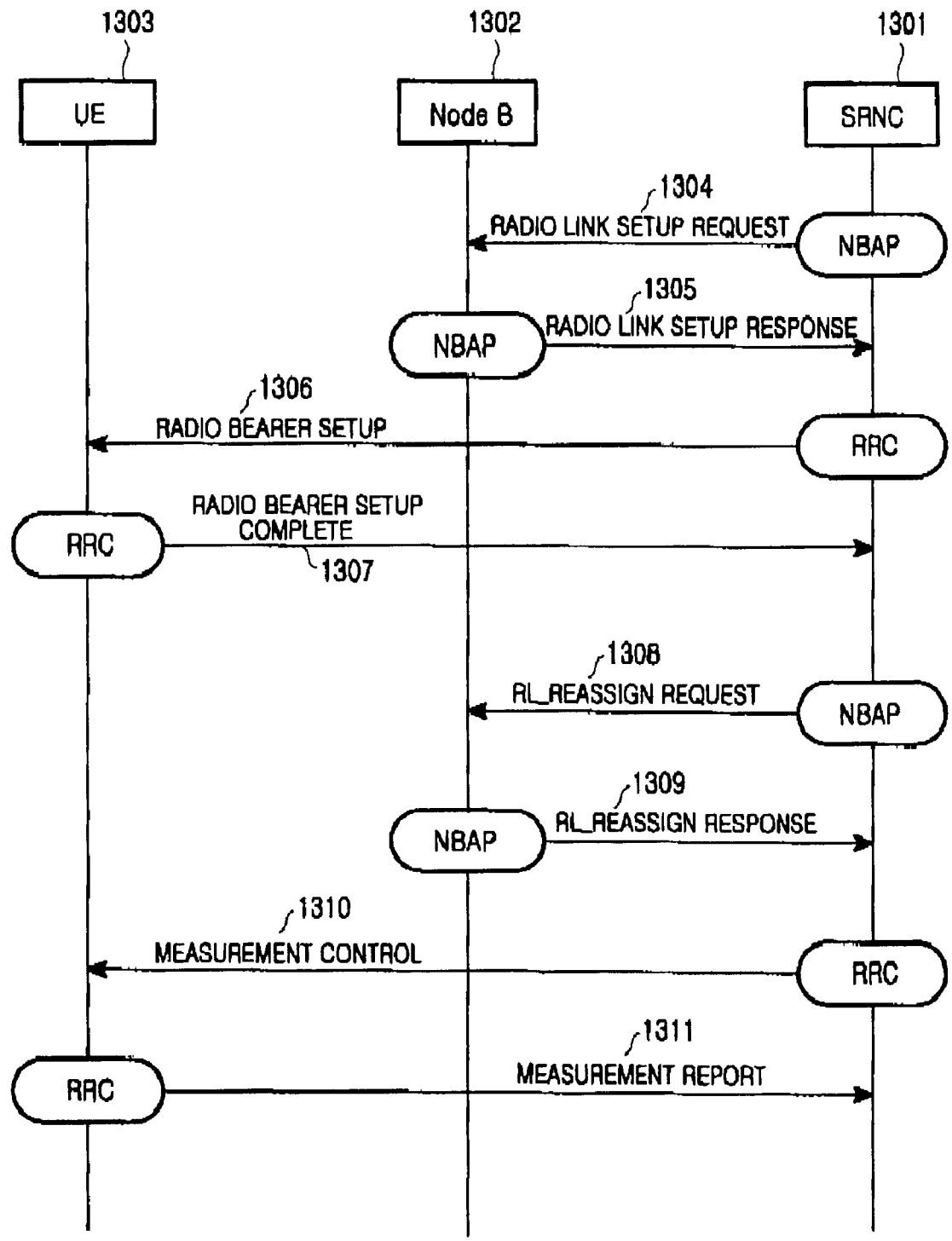
FIG. 13 illustrates a signaling procedure in a handover state in an NB-TDD mobile communication system according to an embodiment of the present invention.

FIG. 13 illustrates a method for a signaling message for inter-RAT measurement, on the assumption that the inter-frequency or inter-RAT measurement parameters are previously defined and then an index corresponding to the defined parameters is transmitted. FIG. 13 shows how to apply the operation flow between Node B and UE, described in conjunction with FIG. 11, to a signaling method specified in the 3GPP standard. That is, during radio link setup, the SRNC transmits the pattern information to the Node B, and during radio bearer setup, the SRNC transmits the pattern information to the UE.

Referring to FIG. 13, SRNC 1301 transmits a Radio Link Setup Request NBAP (Node B Application Part) message to Node B 1302 in step 1304, and the Node B 1302 transmits a Radio Link Setup Response NBAP message to the SRNC 1301 in step 1305, accomplishing radio link setup. The term "NBAP" refers to a logical part for performing signaling between Node B and SRNC. Thereafter, the SRNC 1301 transmits a Radio Bearer Setup RRC (Radio Resource Control) message to UE 1303 in step 1306, and in response, the UE 1303 transmits a Radio Bearer Setup Complete RRC message to the SRNC 1301 in step 1307, accomplishing radio bearer setup. The term "RRC" refers to a logical part of an upper layer, for managing addition, deletion and change of radio links of UE or Node B.

Table 10 illustrates an example of information that must be transmitted through an RRC message during the radio bearer setup.

TABLE 10

| Parameters |
| --- |
| Starting SFN (MPSP) |
| Measurement pattern sequence status flag |
| Total length of pattern sequences (MPSRN) |
| Measurement purpose |
| Patterns    MPS index |
|          MPS    MP length |
|              Code, Time slot |
|              MPI |
|              . . . |
|          . . . |

Parameters used in Table 10 include Starting SFN (MPSP) indicating a frame number of a measurement starting frame, Measurement pattern sequence status flag indicating availability of every MPS used for measurement, Total length of pattern sequences (MPSRN) indicating the total length of measurement period, and Patterns indicating each MPS. The Patterns include MPS index indicating an index of the MPS, MP length indicating a length of the MP for each MP in MPS, Time slot and Code information to be used for uplink/downlink transmissions by UE and Node B for the MP, and MPI indicating an interval to the next MP after the MP. It will be assumed that several MPs can be defined in the MPS and they are used sequentially. If the MPs are not sequentially used, index information for each MP must be added.

Table 11 illustrates another example of information that must be transmitted through an RRC message during the radio bearer setup.

TABLE 11

| Parameters |
| --- |
| Starting SFN (MPSP) |
| Starting sub-frame number (Default value = the first) |
| Measurement pattern sequence status flag |
| Total length of pattern sequences (MPSRN) |
| Measurement purpose |
| Patterns    MPS index |
|          MPS    MP length (# of sub-frames) |
|              Code, Time slot |
|              MPI |
|              . . . |
|          . . . |

Most parameters used in Table 11 are identical to the parameters used in Table 10. In Table 11, Starting sub-frame number (Default value=the first) is used to set a unit of an inter-frequency or inter-RAT measurement starting point to a subframe unit instead of a frame unit, and MP length, unlike MP length used in Table 10, is used to set a unit of an MP length to a subframe unit. That is, a unit of MP becomes 5 ms*n (where n is a natural number). It is possible to combine setting a unit of inter-frequency or inter-RAT measurement starting point to a frame unit or subframe unit with setting a unit of MP length to a frame unit or subframe unit.

In FIG. 13, after the radio bearer setup is performed through the above-stated process, if the SRNC 1301, while communication is performed between the UE 1303 and the Node B 1302, recognizes that the UE 1303 is required to perform inter-RAR measurement, the SRNC 1301 transmits to the Node B 1302 an RL_Reassign Request NBAP message for requesting channel assignment for measurement in step 1308. The NBAP message is a message for requesting channel change through channel reassignment on a corresponding UE for the inter-frequency or inter-RAT measurement. In step 1309, the Node B transmits an RL_Reassign Response NBAP message to the SRNC 1301 in response to the RL_Reassign Request NBAP message. Upon receiving the response from the Node B 1302, the SRNC 1301 transmits, in step 1310, a Measurement Control RRC message for measurement control to the UE 1303. Through the Measurement Control RRC message, the SRNC 1301 transmits to the UE 1303 an index for one of the patterns transmitted during radio bearer setup, and upon receiving the Measurement Control RRC message from the SRNC 1301, the UE 1303 analyzes the index and determines a frame for the inter-RAT measurement. In addition, the UE 1303 analyzes a pattern to be used in each frame, reassigns channelization codes of time slots reserved according to each pattern, and continues communication using the reassigned channelization codes. The UE 1303 performs the inter-RAT measurement while continuously performing the communication. Since the Node B 1302 also recognizes that the UE is performing the inter-RAT measurement, the communication can be performed over the channelization codes for the reserved time slots. After the inter-RAT measurement, the UE 1303 can transmit, in step 1311, inter-frequency or inter-RAT measurement result to the SRNC 1301 along with a Measurement Report RRC message. In FIG. 13, for a signal flow among UE, Node B and SRNC for the case where inter-frequency or inter-RAT measurement parameters are provided to the UE each time the inter-frequency or inter-RAT measurement must be performed, the SRNC 1301 transmits parameters illustrated in Table 10 and Table 11 to the Node B 1302 through an RL_Reassign Request message in step 1308 of FIG. 13, and transmits a Measurement Control message to the UE 1303 in step 1310 of FIG. 13.

Figure 14:
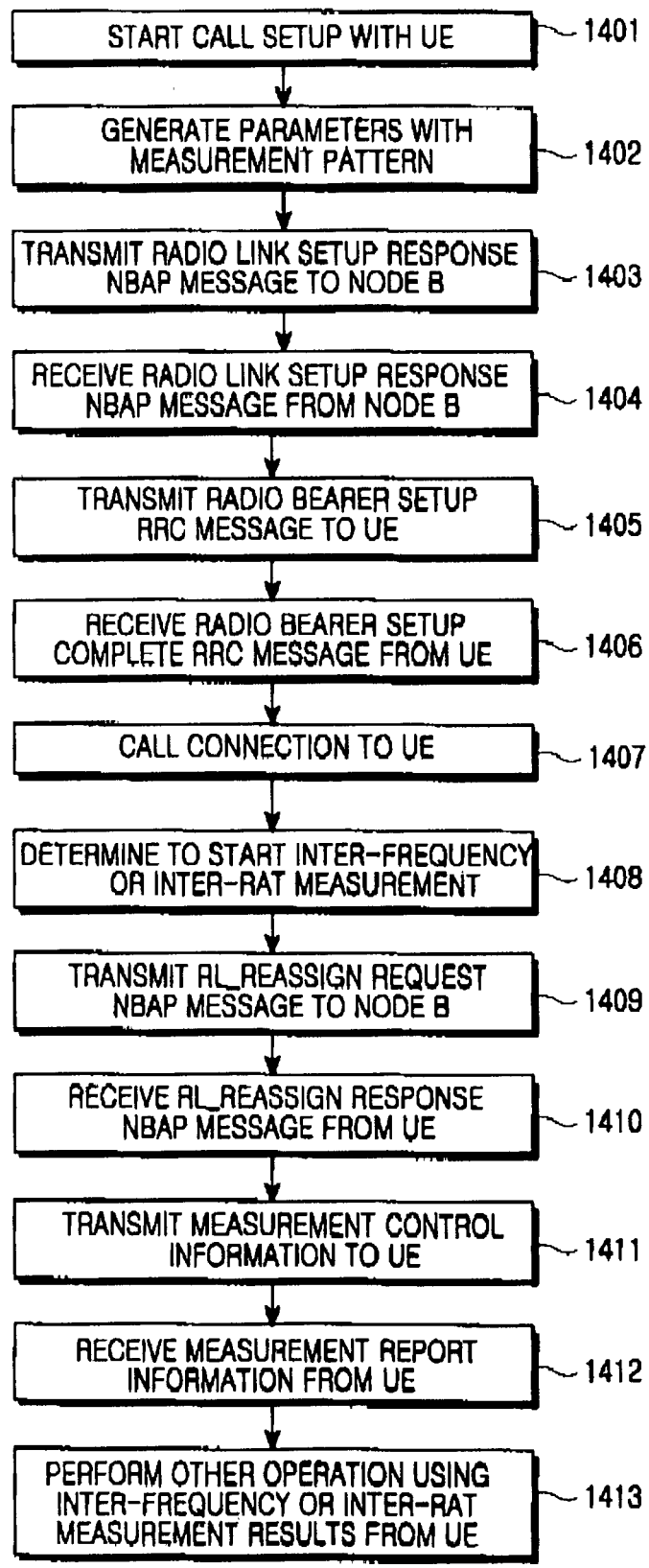
FIG. 14 illustrates an operation of an RNC according to an embodiment of the present invention.
Figure 15:
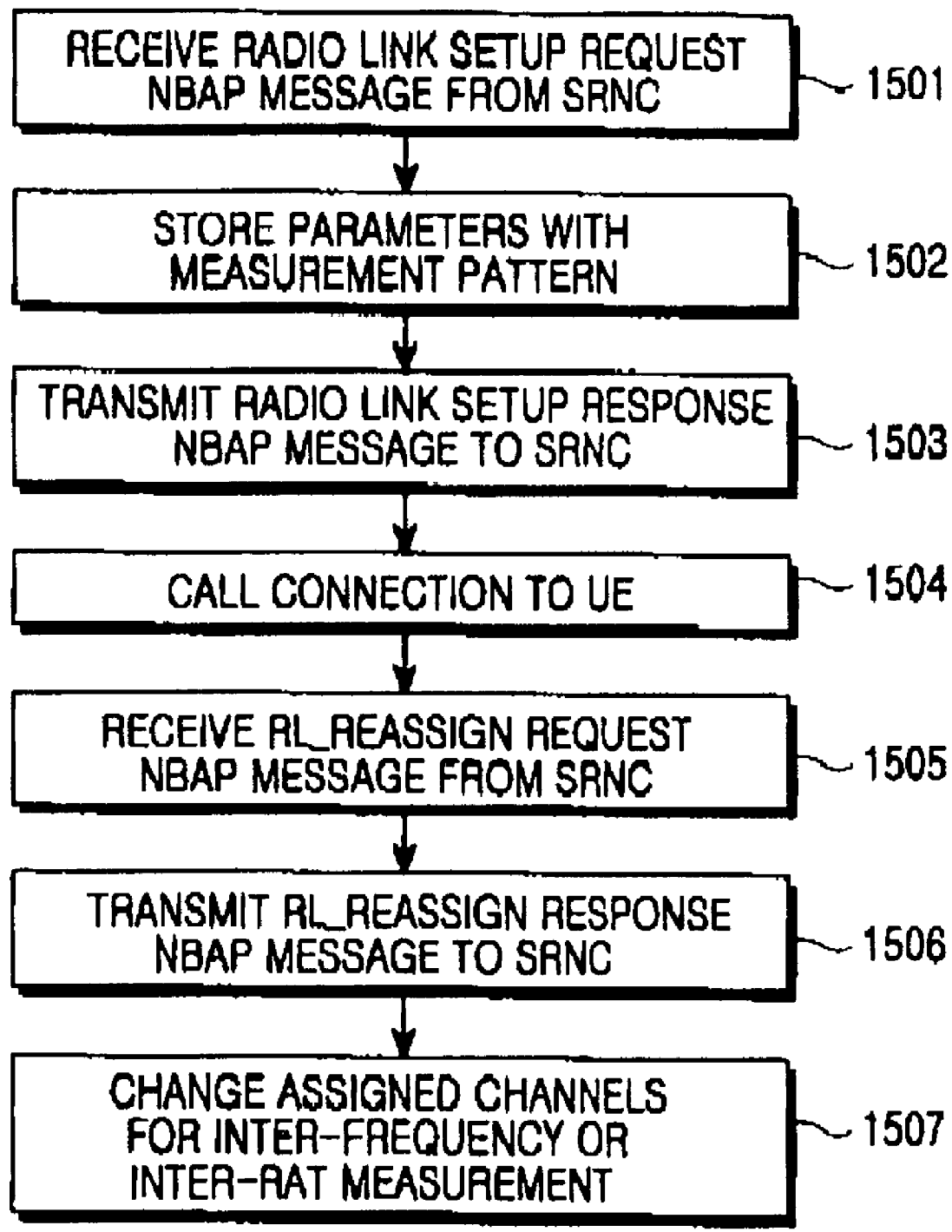
FIG. 15 illustrates an operation of a Node B according to an embodiment of the present invention.
Figure 16:
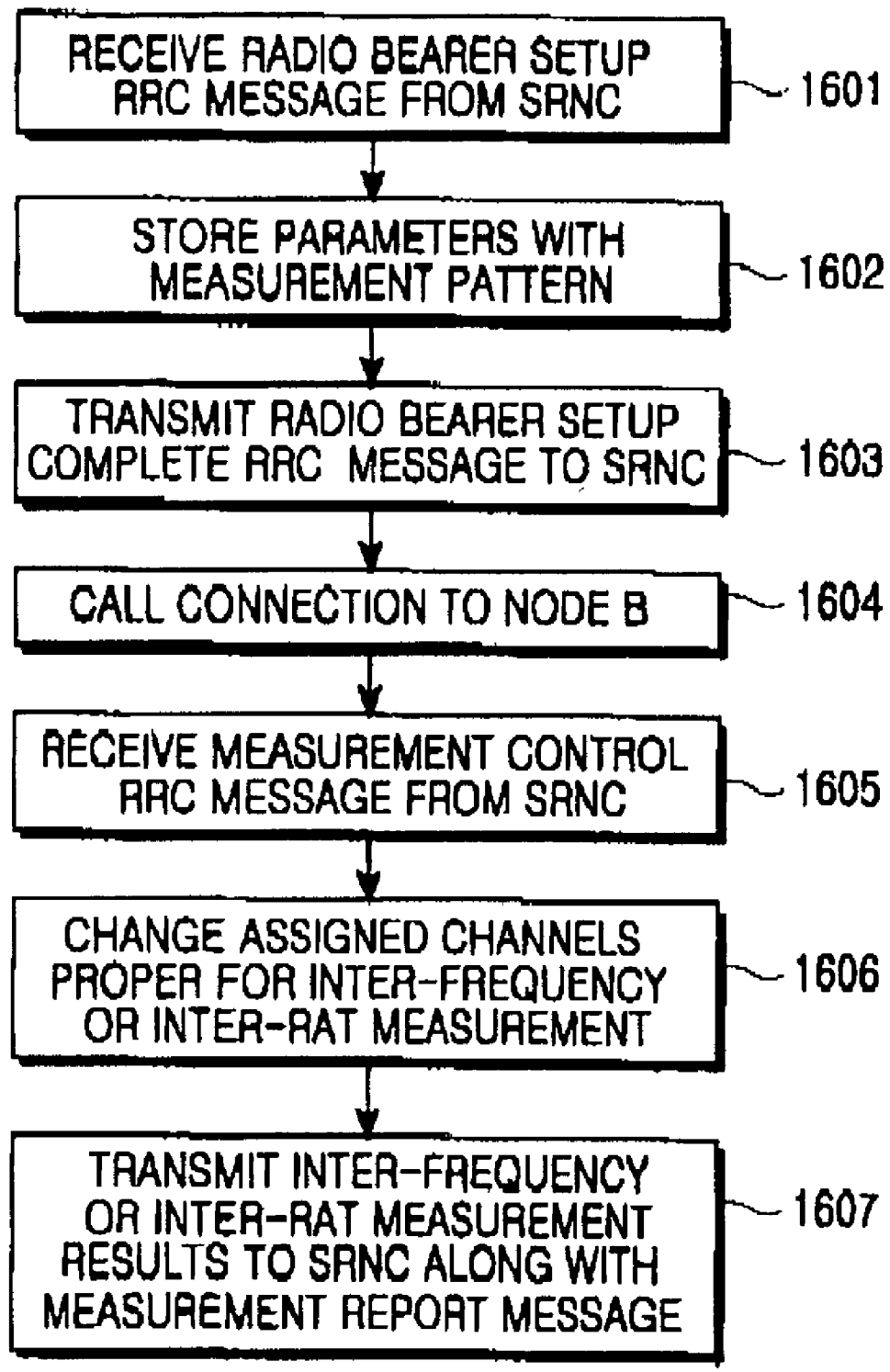
FIG. 16 illustrates an operation of a UE according to an embodiment of the present invention.

FIGS. 14, 15 and 16 illustrate operations of SRNC, Node B and UE, performed during inter-frequency measurement or inter-RAT measurement. It will be assumed in FIGS. 14, 15 and 16 that parameters to be used for the inter-frequency measurement or inter-RAT measurement are previously agreed among UE, Node B and SRNC, and during the measurement, an index corresponding to the parameters is transmitted from the SRNC to the UE and the Node B. FIG. 14 is a flowchart illustrating an operation of SRNC during inter-RAT signal measurement.

Referring to FIG. 14, as SRNC starts call setup with UE in step 1401, the SRNC generates, in step 1402, various parameters necessary for call setup with the UE, including pattern information for inter-RAT measurement. The SRNC transmits the generated parameters to Node B through an NBAP message in step 1403, and receives a response NBAP message from the Node B in step 1404. Thereafter, the SRNC transmits the parameter information to the UE through a Radio Bearer Setup RRC message in step 1405, and receives a Radio Bearer Setup Complete message from the UE in step 1406. Then, the SRNC performs call connection to the UE in step 1407. If the SRNC recognizes in step 1408 that the UE is required to perform inter-RAT measurement, the SRNC transmits, in step 1409, an RL_Reassign Request NBAP message to a Node B where the UE is included, to request channel reassignment for the inter-RAT measurement. The SRNC transmits index information indicating one of the inter-RAT measurement patterns previously transmitted during radio link setup, to the Node B through the NBAP message. The SRNC receives an NBAP message from the Node B in step 1410. Through the NBAP message from the Node B, the SRNC determines whether channel reassignment i.e., channel change, for inter-frequency or inter-RAT measurement is available by the UE. If the UE can perform inter-frequency or inter-RAT measurement using resources reserved for the inter-frequency or inter-RAT measurement, the SRNC transmits Measurement Control information to the UE through Measurement Control RRC message in step 1411. The SRNC transmits index information indicating one of the inter-RAT measurement patterns previously transmitted during radio bearer setup, to the UE through the RRC message. The UE determines an inter-RAT measurement pattern based on the index information, and reassigns the above-stated transmission/reception time slots as time slots reserved for the inter-RAT measurement. The SRNC receives, in step 1412, inter-RAT measurement results transmitted by the UE through a Measurement Report message, which is an RRC message. In step 1413, the SRNC performs other operations such as a handover based on the measurement results.

FIG. 15 is a flowchart illustrating an operation of Node B during inter-RAT measurement. Referring to FIG. 15, in step 1501, Node B receives a Radio Link Setup Request NBAP message from SRNC, and acquires pattern information for inter-RAT measurement from the received message. In step 1502, the Node B stores the pattern information. Thereafter, in step 1503, the Node B transmits a Radio Link Setup Response NBAP message to the SRNC to inform the radio link setup, and then performs call connection with UE in step 1504. The Node B which is maintaining a call with the UE in step 1504, receives an RL_Reassign Request NBAP message from the SRNC in step 1505. After receiving the NBAP message, the Node B analyzes an index in the NBAP message and determines availability of channel assignment, i.e., channel change, using channelization codes reserved for inter-RAT measurement by the UE. Based on the determined channel change availability, the Node B transmits channel change availability to the SRNC along with an NBAP message in step 1506. Thereafter, in step 1507, the Node B assigns radio resources (channelization codes corresponding to DL time slots and UL time slots) reversed by the UE for the inter-RAT measurement, and maintains communication with the UE using the assigned radio resources.

FIG. 16 is a flowchart illustrating an operation of UE during inter-RAT measurement. Referring to FIG. 16, in step 1601, UE receives a Radio Bearer Setup RRC message from SRNC, and acquires pattern information for inter-RAT measurement from the received message. In step 1602, the UE stores the pattern information. Thereafter, in step 1603, the UE transmits a Radio Bearer Setup Complete RRC message to the SRNC to inform the radio bearer setup, and then maintains communication with the Node B in step 1604. In step 1605, the UE receives Measurement Control information from the SRNC along with an RRC message. The UE reads a pattern information index transmitted by the SRNC from the received RRC message, and selects a pattern to use. In step 1606, the UE changes the transmission/reception channels using channel resources (or radio resources) reserved for inter-RAT measurement according to the pattern, and then maintains communication using the changed channels. The UE performs the inter-RAT measurement in the inter-frequency or inter-RAT measurement period extended due to the resource change, and transmits, in step 1607, the measurement results to the SRNC along with a Measurement Report RRC message.

The present invention is not restricted to the signaling method for inter-frequency or inter-RAT measurement, wherein as described above, SRNC previously transmits inter-frequency or inter-RAT measurement parameters to Node B and UE during radio link and radio bearer setup, and transmits only an index through a Measurement RRC message when inter-frequency or inter-RAT measurement is required. The SRNC, as it recognized that inter-frequency or inter-RAT measurement is required, can transmit various parameters for inter-frequency or inter-RAT measurement through an RRC message. In other words, the inter-frequency or inter-RAT measurement parameters can be transmitted from the SRNC to the Node B and the UE, when the UE first starts communication with the system. Alternatively, the SRNC can transmit the inter-frequency or inter-RAT measurement parameters to the UE along with a Measurement Control message, when the inter-frequency measurement or the inter-frequency or inter-RAT measurement is required.

Figure 17:
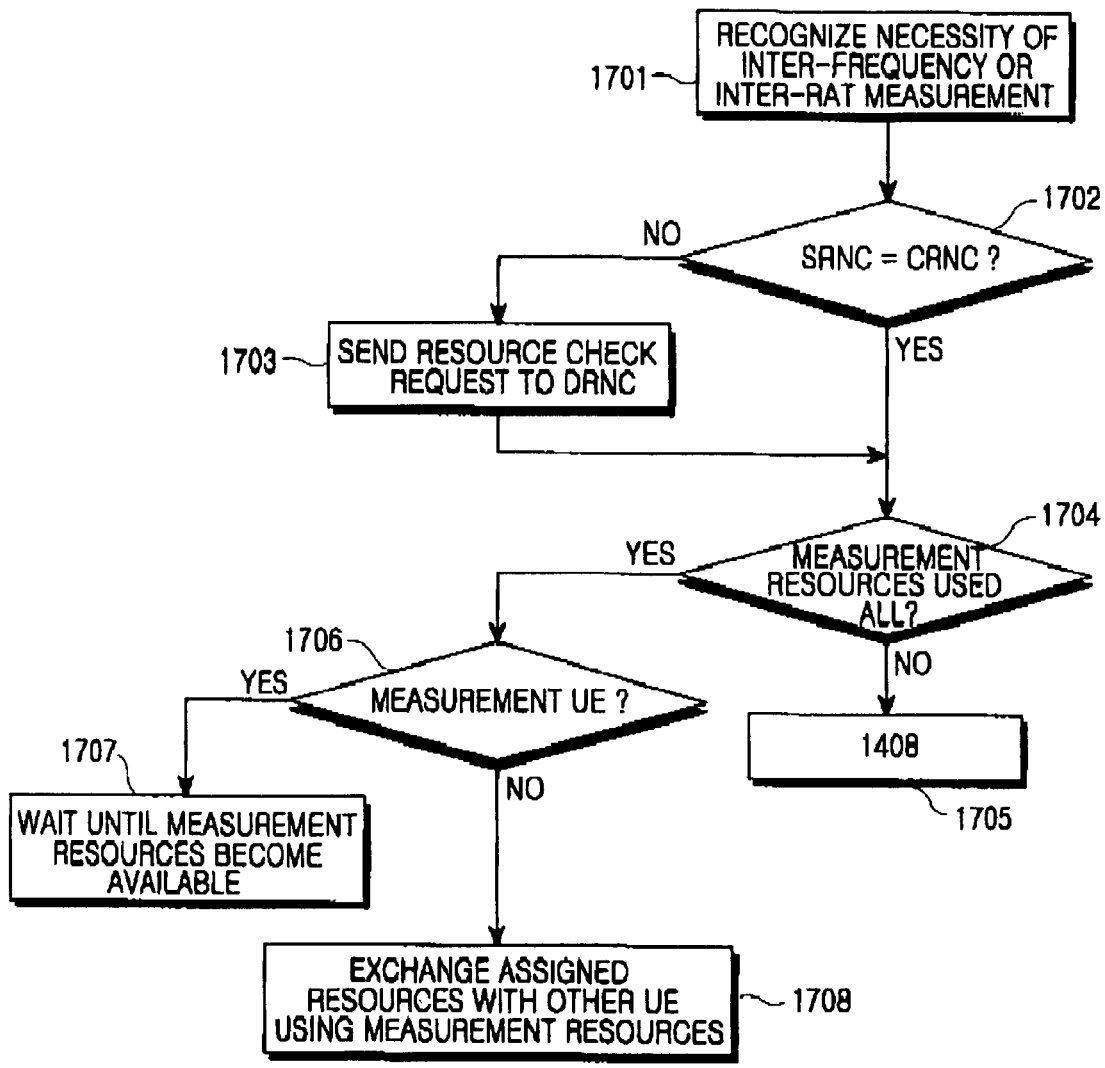
FIG. 17 illustrates an operation of an RNC for efficient improvement according to an embodiment of the present invention.

FIG. 17 proposes a method for giving priority to inter-frequency or inter-RAT measurement-related UEs, thus to use them along with normal UEs (not related to inter-RAT measurement), instead of restrictively using channelization codes reserved by the method for assigning the time slots reversed for inter-frequency or inter-RAT measurement, only for inter-RAT measurement-related UEs. In the case where channelization codes for specific time slots are reserved for inter-RAT measurement-related UEs, even though there is no UE which is required to perform inter-RAT measurement, the reserved resources cannot be assigned to normal UEs, decreasing utilization efficiency of the resources. In order to solve this problem, it is preferable to give lower priority to the resources instead of firmly reserving the resources, so as not to assign the resources to the normal UEs. That is, it is possible to assign resources except the reserved resources to the inter-RAT measurement-related UEs, and assign the resources even to normal UEs only when the resources are scarce. If lower priority is given to increase efficiency as stated above, there is a possibility that resources for inter-RAT measurement will be assigned to UEs which are not required to perform inter-RAT measurement. At this moment, if there is a UE which is required to perform inter-RAT measurement, it is necessary to exchange resources of a UE which is not required to perform the inter-RAT measurement for resources of the UE which is required to perform the inter-RAT measurement. Of course, if it becomes unnecessary to perform inter-RAT measurement, the UEs may use either the previous resources or the exchanged resources.

Referring to FIG. 17, if SRNC recognizes in step 1701 that a certain UE is required to perform inter-RAT measurement, it is determined in step 1702 whether the SRNC is a CRNC (Controlling RNC) of the UE. The term "CRNC" refers to a RNC connected to the UE. If the SRNC is not a CRNC of the UE, the SRNC sends a request for resource information for the inter-RAT measurement to DRNC in step 1703. Thereafter, the SRNC determines in step 1704 whether resources reserved for inter-RAT measurement are all in use or not. If the resources are not all in use in step 1705, the SRNC performs step 1408 of FIG. 14 and its succeeding steps. However, if the resources are all in use, the SRNC determines in step 1706 whether a UE using the resources is a UE that performs inter-RAT measurement. If the UE that performs inter-RAT measurement uses the resources, the UE waits until the resources become available, in step 1707. However, a UE that is not required to perform inter-RAT measurement is assigned the resources for inter-RAT measurement, the SRNC exchanges the resources used by the two UEs in step 1708. In this case, since the resources assigned to both of the two UEs must be changed, the corresponding information must be transmitted to Node B and the two UEs. That is, information on the two UEs must be transmitted to the Node B described in conjunction with the procedure of FIG. 14, and the procedure described in conjunction with FIG. 16 must be used for a UE that is required to perform inter-RAT measurement. In addition, a process of applying the reserved resources to the original UE must be performed.

Meanwhile, the UE reports this to the SRNC at an inter-frequency or inter-RAT measurement ending point, thus to release DL time slots and UL time slots, where were reassigned to the UE for inter-RAT measurement. Further, the UE continues communication using the previously used DL time slots and UL time slots.

Figure 18:
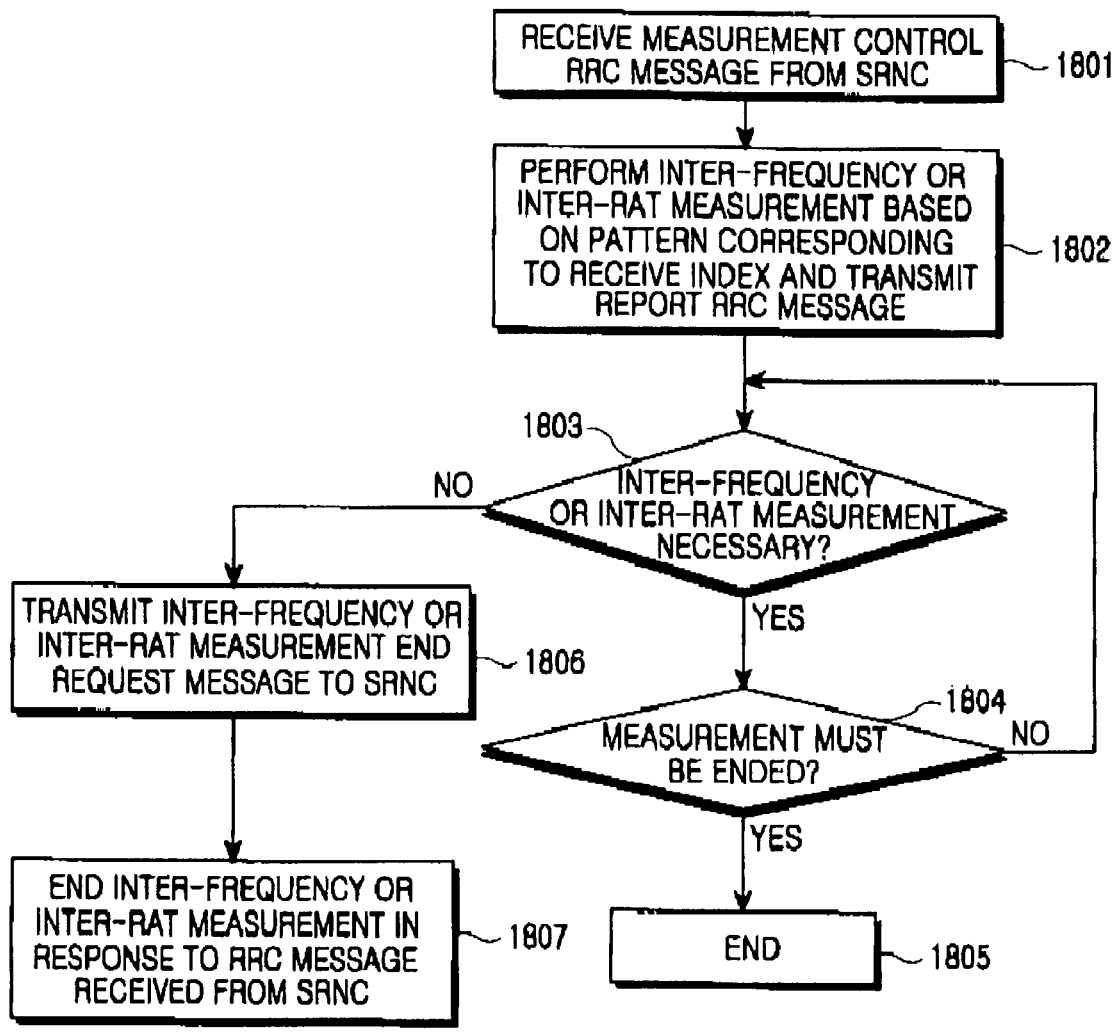
FIG. 18 illustrates an operation of a UE for efficiency improvement according to an embodiment of the present invention.

FIG. 18 is a flowchart illustrating a method for giving a UE authority to interrupt inter-RAT measurement thereby to increase efficiency. In this embodiment, the UE performs inter-RAT measurement based on a pattern corresponding to an index transmitted thereto, contributing to a reduction in signaling load for inter-RAT measurement. However, if the UE recognizes that inter-RAT measurement becomes unnecessary while it performs the inter-RAT measurement according to the pattern, continuously performing the inter-RAT measurement based on the pattern will decrease the efficiency. Therefore, in this embodiment, the UE that performs inter-RAT measurement based on the pattern transmits an inter-RAT measurement end request to SRNC along with an RRC message, so the UE can end the inter-RAT measurement even before the inter-RAT measurement ending point.

Referring to FIG. 18, after receiving pattern information, UE receives in step 1801 a Measurement Control RRC message from SRNC and detects a pattern corresponding to an index included in the received pattern information. In step 1802, the UE performs inter-RAT measurement according to the detected pattern, and then transmits a Measurement Report RRC message. The UE determines in step 1803 whether the inter-RAT measurement is continuously necessary, and if the inter-RAT measurement is continuously necessary, the UE continuously performs the inter-RAT measurement. If it is determined in step 1804 that the measurement must be ended according to the pattern, the UE ends the inter-RAT measurement and restores the changed resource to the original state in step 1805. If it is determined in step 1803 that the inter-RAT measurement becomes unnecessary before the inter-RAT measurement is ended according to the pattern, the UE transmits in step 1806 an inter-RAT measurement end request to the SRNC along with an RRC message. Upon receiving a Response RRC message from the SRNC, the UE ends in step 1807 the inter-RAT measurement regardless of the pattern.

Figure 19:
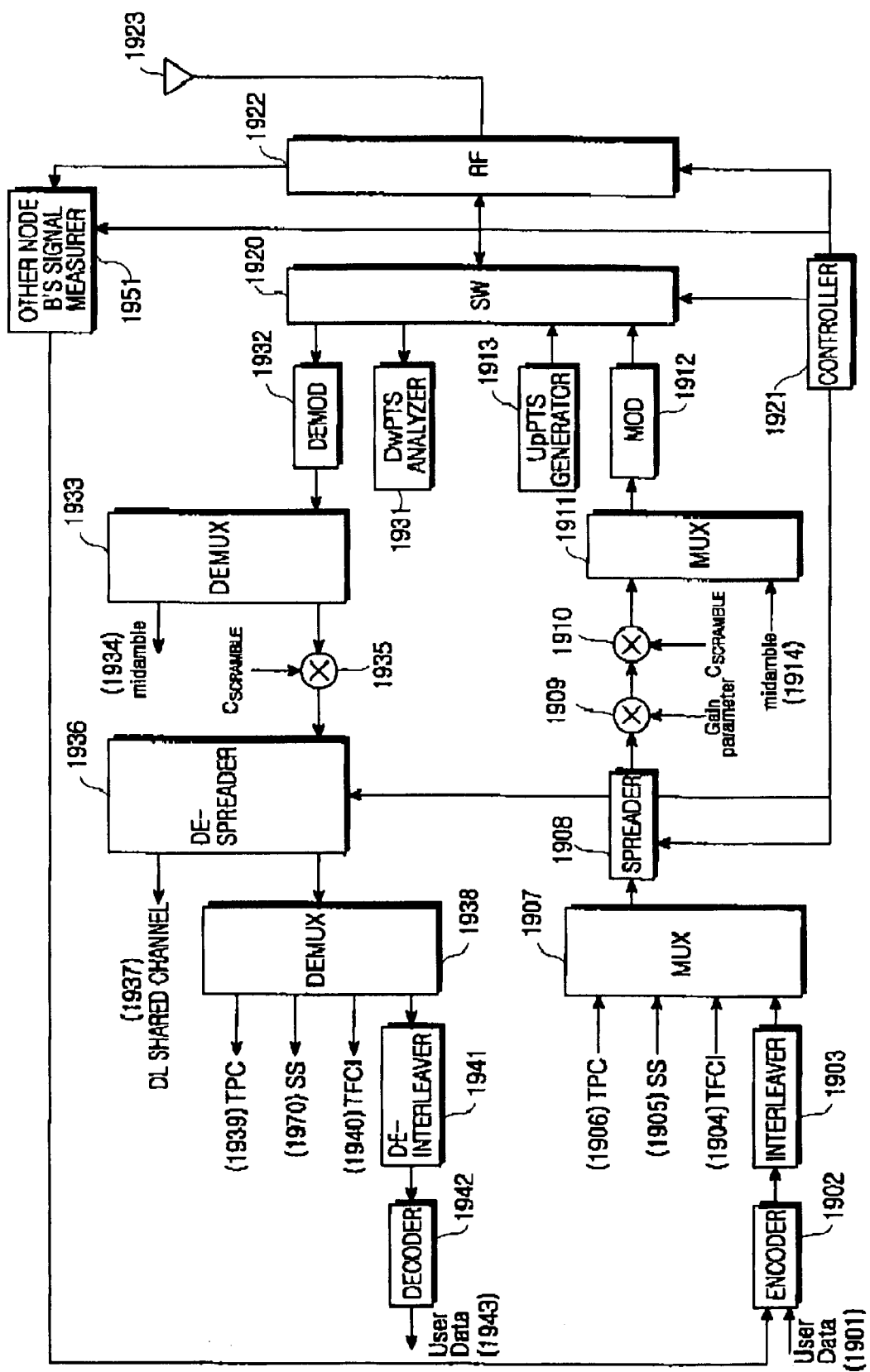
FIG. 19 illustrates a structure of a UE transceiver according to an embodiment of the present invention.

FIG. 19 illustrates a structure of a transceiver in a UE according to an embodiment of the present invention, wherein a transmitter transmits a UL physical channel from UE to Node B, and a receiver receives a DL physical channel from Node B. Since an NB-TDD system uses the same frequency band for uplink and downlink transmissions, the transmitter and receiver are separated by a switch.

First, a process of transmitting a UL channel with user data in the UE transceiver of FIG. 19 will be described herein below.

User data 1901 includes signaling information and user data information from an upper layer. The user data 1901 undergoes coding by an encoder 1902. The coding is performed to detect a possible error generated during data transmission, and correct the detected error. The coding is classified into convolutional coding, turbo coding, and channelization orthogonal coding. The user data coded by the encoder 1902 is subject to interleaving at an interleaver 1903. The interleaving is performed to prevent a possible burst error occurring in user data transmitted over a physical channel. The interleaving is a technique for changing the transmission order of user data according to a predetermined rule. By doing so, although a burst error has occurred due to noises during data transmission, error positions are dispersed through deinterleaving at a receiver, thereby minimizing an influence of the burst error. The user data interleaved by the interleaver 1903 is provided to a multiplexer 1907, and the multiplexer 1907 generates a user data part by multiplexing the interleaved user data with TFCI (Transmission Format Combination Indicator) 1904, SS (Synchronization Shift) 1905, and TPC (Transmit Power control Command) 1906. The TFCI 1904 indicates, when several kinds of user data is simultaneously transmitted, a data rate and a transmission format of each user data, and enables Node B to correctly analyze the data. The SS 1905, a command transmitted every subframe, is used to adjust DL synchronization. The TPC 1906, a command for power control, is used to control transmission power of a downlink transmitted from Node B to UE. The data part generated by the multiplexer 1907 is provided to a spreader 1908, and the spreader 1908 multiplies the data part by an input channelization code, for spreading. The channelization code used by the spreader 1908 is assigned to the UE when communication is started.

The present invention provides a process of changing a channel transmitted by the UE, for inter-frequency or inter-RAT measurement. Upon receiving an inter-frequency or inter-RAT measurement start command, the UE selects inter-frequency or inter-RAT measurement parameters based on information transmitted from SRNC, and then performs channel reassignment according to an inter-frequency or inter-RAT measurement pattern based on the selected parameters. To perform the channel reassignment, the spreader 1908 must multiply the received data part by a channelization code to be used in a pattern for the inter-frequency or inter-RAT measurement instead of the existing channelization code. The channelization code information is provided by a controller 1921. For inter-RAT measurement, the controller 1921 determines information on uplink/downlink transport channels to be used by the UE for data transmission/reception based on the parameters determined by SRNC, and enables the spreader 1908 to use channelization codes for the time slots assigned to the uplink/downlink transport channels during data transmission/reception. The spreader 1908 multiplies the user data part by the channelization code reassigned for the inter-frequency or inter-RAT measurement.

The user data part output from the spreader 1908 is multiplied by a channel gain by a multiplier 1909. The channel gain is determined based on transmission power of a UL channel transmitted from UE to Node B. The user data part output from the multiplier 1909 is multiplied by a scrambling code by a multiplier 1910. The scrambling code is used to identify Node Bs and reduce cross-correlation between multipath components of the same signal. The user data part scrambled by the multiplier 1910 is segmented into two parts, and a midamble 1914 is interposed between the two segmented user data parts. The two user data parts and the midamble 1914, together with GP, constitute one UL time slot. The midamble 1914 is used to identify UEs using the same time slot, identify Node B channels using the same time slot, and perform channel estimation during DL/UL transmission. In addition, the midamble 1914 is used to measure a multipath loss from Node B to UE during DL transmission. Further, since each Node B uses its own unique midamble, the midamble is used to identify Node B. For the midamble, 128 kinds of specific sequences are used. Each Node B uses one of the specific sequences, and each UE in the Node B uses a shift version of the specific sequence. The GP is used to prevent interference due to multipath delay between DL and UL time slots, such as interference caused by overlapping between a DL slot and a UL slot, and actually, nothing is transmitted in the GP period.

A UL user channel output from the multiplexer 1911 is modulated by a modulator 1912. A modulation technique used by the modulator 1912 is QPSK (Quadrature Phase Shift Keying) or 8PSK (8-Phase Shift Keying). The UL user channel output from the modulator 1912 is provided to a switch (SW) 1920, and the switch 1920 transmits the UL user channel to the Node B at a time slot designated to transmit the UL user channel.

In the embodiment, since channels are reassigned for inter-frequency or inter-RAT measurement before being transmitted, the UE transmits the channels in a newly assigned time slot period instead of the current time slot period, by controlling the switch 1920 through the controller 1921. Information on the new time slot is determined according to a pattern for extending an inter-frequency or inter-RAT measurement period, and the pattern is selected in accordance with the procedure of FIG. 25. The controller 1921 controls a transmission point of a UL channel, controls a transmission point of UpPTS and a reception point of DwPTS according to a subframe structure of an NB-TDD system, and controls the switch 1920 according to a reception point of a DL channel transmitted from Node B. The UpPTS is generated by a UpPTS generator 1913, and used to acquire UL transmission synchronization. The UL user channel output from the switch 1920 is up-converted into a carrier frequency band signal by an RF (Radio Frequency) unit 1922, and then transmitted to the Node B through an antenna 1923. The signal transmitted to the Node B is transmitted again to UTRAN. When the inter-frequency or inter-RAT measurement according to the present invention is performed, the UE monitors other systems in a period except the time slots where the UE signal is transmitted and received. Therefore, in a time slot period where the UE does not transmit UL channels or receive DL channels, the controller 1921 controls a frequency of the RF unit 1922 to monitor other systems. For the inter-frequency or inter-RAT measurement, the controller 1921 changes a frequency band of the RF unit 1922 to a frequency band used by a neighboring Node B, thus to receive a signal from the neighboring Node B. After the inter-frequency or inter-RAT measurement, the controller 1921 controls the RF unit 1922 to return the current frequency band to the frequency band originally used for UL transmission.

Next, a process of receiving a DL channel in the UE transceiver of FIG. 19 will be described herein below.

Downlink channels received through the antenna 1923 are own-converted into a baseband signal by the RF unit 1922, and then provided to the switch 1920. The switch 1920, under the control of the controller 1921, is connected to a demodulator 1932 at a time point where a downlink channel is to be received. A signal received by the UE may include DwPTS transmitted from the Node B and DwPTSs transmitted from other Node Bs. The switch 1920 is connected to a DwPTS analyzer 1931 at a reception point of DwPTS, to provide received DwPTSs to the DwPTS analyzer 1931. The DwPTS is received by the UE in an initial cell search process for searching a Node B, to indicate a position of P-CCPCH, a physical channel for transmitting BCH with system information, and a position of a currently received DL frame in a multiframe structure, and is used to measure synchronization of a UL channel. The DwPTS analyzer 1931 may be replaced with a correlator or a matched filter.

The demodulator 1932 demodulates the DL channel according to a modulation technique used by the Node B, and provides its output to a demultiplexer 1933. The demultiplexer 1933 separates (demultiplexes) the DL channel into a midamble 1934 and a user data part. The midamble 1934 is used to measure a power level of a downlink channel received from Node B, identify a downlink channel transmitted by the Node B, and determine presence of data transmitted to the UE through analysis of the midamble.

The downlink data part output from the demultiplexer 1933 is applied to a multiplier 1935, and the multiplier 1935 multiplies the demodulated DL data part by a scrambling code used by the Node B, for descrambling. The descrambled data is provided to a despreader 1936. The despreader 1936 separates the downlink data part into user data and a DL shared channel 1937 over which Node B system information or UE control information is transmitted, and despreads the spread user data and DL shared channel by multiplying them by an OVSF (Orthogonal Variable Spreading Factor) code used by the Node B for the user data part and the downlink shared channel.

When the UE performs inter-RAT measurement, the despreader 1936 changes downlink transport channels through channelization code reassignment. For the inter-RAT measurement, the controller 1921 provides channelization code information to the despreader 1936 so that the UE can receive data with newly assigned channels. The despreader 1936 then multiplies the downlink transport channels by the reassigned channelization codes, for despreading.

The user data output from the despreader 1936 is provided to a demultiplexer 1938, and the demultiplexer 1938 demultiplexes the provided user data into TPC 1939, TFCI 1940, SS 1970 and pure user data. The TPC 1939 is used to control transmission power of an uplink channel to be transmitted by the UE, and the TFCI 1940 is used to distinguish the type of data transmitted from Node B to UE. Further, the SS 1970 is used as a command for requesting synchronization control of an uplink channel transmitted from Node B to UE. The pure user data output from the demultiplexer 1938 is provided to a deinterleaver 1941, and the deinterleaver 1941 disperses burst errors generated during downlink transmission, by deinterleaving, and provides the deinterleaved user data to a decoder 1942. The decoder 1942 decodes the deinterleaved user data and outputs user data 1943.

Figure 5:
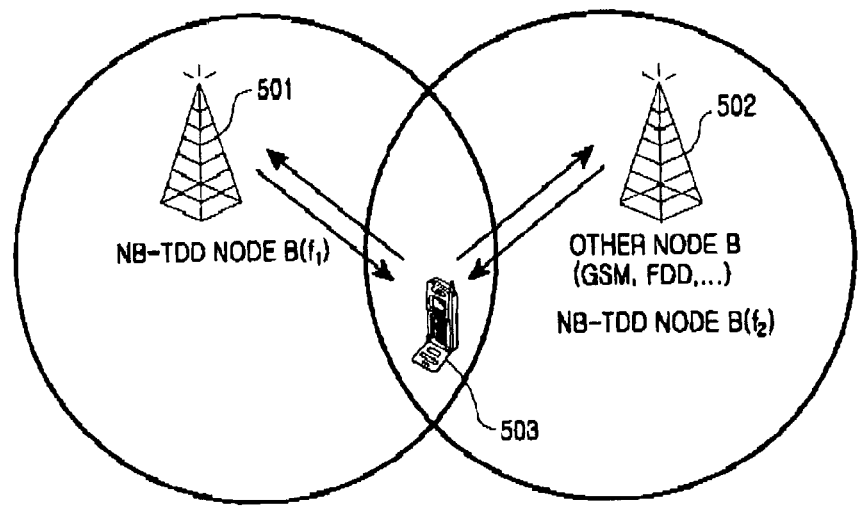
FIG. 5 conceptually illustrates a handover state in a common mobile communication system.
Figure 6:
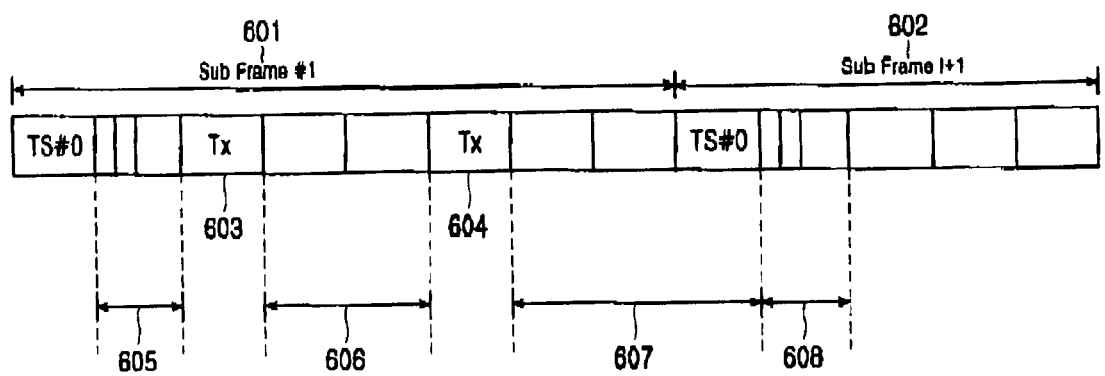
FIG. 6 is a diagram for explaining a period for searching a target Node B in a handover state in a conventional NB-TDD mobile communication system.

Upon receiving an inter-RAT measurement start message, the UE measures signals from other Node Bs in a time slot period where it does not perform data communication with a Node B to which the UE belongs. If the inter-RAT measurement is started, the controller 1921 controls a frequency of the RF unit 1922 to receive signals from other adjacent Node Bs except the current Node B to which the UE belongs. The adjacent Node Bs may include an NB-TDD Node B using the same frequency as that of the current Node B, an NB-TDD Node B using a frequency different from that of the current Node B, or a Node B supporting other communication techniques. The "other communication techniques" may include SGM, FDD, WB-TDD, CDMA2000, and IS-95, as stated in conjunction with FIG. 5, and this has been described with reference to FIGS. 1, 2, 3, and 4.

For the inter-frequency or inter-RAT measurement, other Node B's signals received through the RF unit 1922 are provided to other Node B's signal measurer 1951. The other Node B's signal measurer 1951 reads P-CCPCH, P-SCH, and S-SCH information of the other Node Bs from the signals received from the other Node Bs while the UE does not perform transmission/reception. The measured signal is provided to the transmitter along with the user data 1901, and then transmitted to the Node B, to report the measurement result to SRNC.

Figure 20:
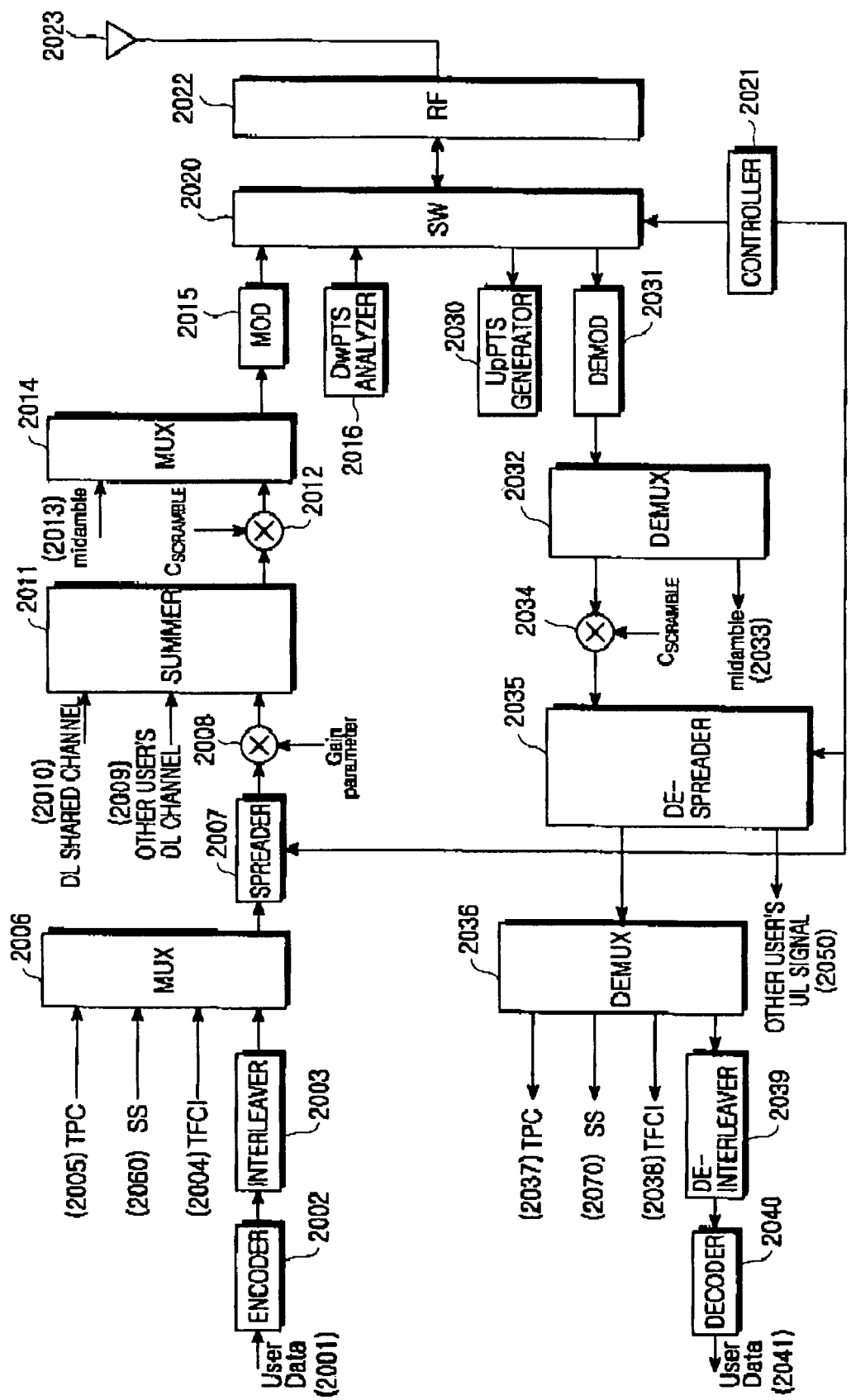
FIG. 20 illustrates a structure of a Node B transceiver according to an embodiment of the present invention.

FIG. 20 illustrates a structure of a Node B transceiver corresponding to the UE transceiver of FIG. 19.

First, a process of transmitting a DL channel from a Node B to UEs in the Node B will be described with reference to FIG. 20. For the sake of convenience, a description will be made of only a part for transmitting a DL channel to a certain user. However, it would be obvious to those skilled in the art that the DL channel can be transmitted to the other users in the Node B in the same method.

Referring to FIG. 20, reference numeral 2001 represents DL data to be transmitted to a user. The DL data 2001 undergoes channelization orthogonal coding through an encoder 2002, and then is provided to an interleaver 2003. The interleaver 2003 interleaves the coded DL data, and provides its output to a demultiplexer 2006. The demultiplexer 2006 generates a user data part by multiplexing the interleaved user data output from the interleaver 2003 with TPC 2005, TFCI 2004, and SS 2060. The user data part is channel-spread by a spreader 2007 with an OVSF code used for a DL channel, and the spread user data part is multiplied by a multiplier 2008 by a channel gain for controlling transmission power of the DL channel to be transmitted to the user. The gain-controlled user data output from the multiplier 2008 is provided to a summer 2011.

The present invention provides a process of changing a channel over which Node B was communicating with UE for inter-frequency or inter-RAT measurement. As described in conjunction with FIG. 11, UE is reassigned a channel for the inter-frequency or inter-RAT measurement, and a channel to be used by the UE is transmitted to Node B. Therefore, the Node B must change a DL channelization code for inter-frequency or inter-RAT measurement, as described in conjunction with FIG. 11. A controller 2021 enables the spreader 2007 to exchange the existing channelization code for the channelization code reassigned for the inter-frequency or inter-RAT measurement. The controller 2021 determines a channelization code to be used in the spreader 2007 according to the parameters transmitted from SRNC to Node B, and the spreader 2007 multiplies the user data part by the channelization code reassigned for the inter-frequency or inter-RAT measurement.

The summer 2011 sums up a DL shared channel 2010, other user's channel 2009 and the user channel. The channels, since they are channel-spread with their own unique OVSF codes, do not interfere with one another, although they are summed. The DL channels output from the summer 2011 are scrambled by a multiplier 2012 with a scrambling code used for the Node B, and then provided to a multiplexer 2014. The multiplexer 2014 generates a DL channel slot by multiplexing the DL channels with a midamble 2013. The midamble 2013 is used by a UE receiving the midamble 2013 to estimate a transmission power level of the Node B.

Further, the midamble 2013 is used to find out the channels transmitted over the DL channel slot multiplexed by the multiplexer 2014.

The DL channel signals output of the multiplexer 2014 are provided to a modulator 2015. The modulator 2015 modulates the provided DL channel signals by QPSK, 8PSK or QAM (Quadrature Amplitude Modulation). The modulated DL channel signals are provided to a switch (SW) 2020, and the switch 2020 is connected to the modulator 2015 at a transmission point of the DL channel slot under the control of the controller 2021, thus to provide the DL channel slot to an RF unit 2022. The switch 2020, under the control of the controller 2021, is connected to a DwPTS generator 2016 to transmit the DwPTS at a DwPTS transmission point. The DwPTS is used by a UE receiving the DwPTS to estimate a position of BCH with Node B information and a level of a Node B signal in an initial cell search process. The RF unit 2022 up-converts the DL channel slot into a carrier frequency band signal, and then transmits the carrier frequency band signal to all UEs in the Node B through an antenna 2023.

Next, a process of receiving UL signals from UEs in the Node B will be described with reference to FIG. 20.

UL signals received through the antenna 2023 are down-converted into baseband signals by the RF unit 2022, and then provided to the switch 2020. The switch 2020, under the control of the controller 2021, provides UL signals received from the UEs to a demodulator 2031 at a predetermined point. The controller 2021 has a function of multiplying the UL and DL signals by reassigned channelization codes by controlling the spreader 2007 and a despreader 2035 depending on information on new channelization codes based on the parameters determined by SRNC to reassign data transmission/reception channels between UE and Node B during inter-frequency or inter-RAT measurement, and a function of controlling the switch 2020 by determining a point when the UEs in the Node B transmit the UL channel signals. In addition, the controller 2021 has a function of connecting the switch 2020 to a UpPTS analyzer 2030 at a reception point of the UpPTS, to analyze UpPTS received from each UE.

The demodulator 2031 demodulates the received UL signal, and provides the demodulated UL signal to a demultiplexer 2032. The demultiplexer 2032 separates (demultiplexes) the received UL signal into a midamble 2033 and a UL signal data part. The midamble 2033 is used to detect multiple users, detect a channel environment between UE and Node B, and estimate a transmission signal level of UE. The UL signal data part output from the demultiplexer 2032 is provided to a multiplier 2034, and the multiplier 2034 multiplies the UL signal data part by a scrambling code used by the UE transceiver of FIG. 19, for descrambling. The descrambled UL signal data part is provided to a despreader 2035, and the despreader 2035 multiplies the descrambled UL signal data part by the same channelization code as the channelization code used by the UE. Upon receiving an inter-frequency or inter-RAT measurement request from SRNC, the UE reassigns data transmission/reception channels based on the pattern determined by the SRNC. The channel reassignment request is transmitted not only to the UE but also to the Node B. The controller 2021 changes channelization codes by controlling the despreader 2035 according to the channel reassignment information transmitted by the SRNC, and multiplies the input data part by the reassigned channelization codes. The data part multiplied by the reassigned channelization codes is separated according to users, and the UL signal data part of the user is provided to a demultiplexer 2036.

The demultiplexer 2036 demultiplexes the UL signal data part of the user into TPC 2037, TFCI 2038, SS 2070, and user data. The TPC 2037 is used by a UL power controller (not shown) to control transmission power of the UL signal. The TFCI 2038 is used to analyze a transmission format used for the user data part, and the SS 2070 is used to control a transmission point of a DL channel transmitted to the UE. The user data output from the demultiplexer 2036 is deinterleaved by a deinterleaver 2039, and then decoded by a decoder 2040, generating user data 2041. The other user's UL channel 2050 output from the despreader 2035 is also received through the same process as the user data.

The user data 2041 received through the above-stated process may include inter-frequency or inter-RAT measurement data generated by measuring signals from other Node Bs by the UE, and the measurement data is transmitted to SRNC. The SRNC then performs other operations such as a handover, using the reported measurement data.

Although the present invention have been described with reference to the NB-TDD technique for the sake of convenience, the method proposed by the present invention can be used in the same way even in a mobile communication system which separates uplink/downlink transmissions by other TDD techniques similar to the NB-TDD.

Summarizing, for the inter-frequency or inter-RAT measurement, the UE changes such resources as the existing time slots in an inter-frequency or inter-RAT measurement period, thus to fully utilize the inter-frequency or inter-RAT measurement period. In particular, the present invention provides one of possible methods for changing an inter-RAT measurement period, for measurement on an FDD system, and a signaling method among SRNC, Node B and UE, for realizing the possible methods, thereby to increase inter-RAT measurement performance by the UE. The increase in inter-RAT measurement performance secures more correct and flexible results of the inter-RAT handover.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for measuring by a UE (User Equipment) a synchronization signal on a control channel and second Node B information from a second Node B in a system including a first Node B, the second Node B adjacent to the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a TDD communication technique using a frequency band different from that of the TDD CDMA communication technique, the synchronization signal for synchronizing the UE with the second Node B and the control channel indicating the second Node B information being transmitted from the second Node B to the UE over at least one time period among the plurality of time periods, the method comprising the step of:

changing a position of the downlink time period over which the downlink channel is transmitted from the first Node B to the UE, and changing a position of the uplink time period over which the uplink channel is transmitted from the UE to the first Node B, so that the time period of the control channel transmitted from the second Node B to the UE is located within a previous subframe and within one of a next subframe and a frame.

2. The method of claim 1, wherein a first time period and a second time period among a plurality of time periods in the previous subframe are changed to the downlink time period and the uplink time period, respectively, and a third and fourth time periods each adjacent to a second switching point existing in the next subframe are changed to the downlink time period and the uplink time period, respectively.

3. The method of claim 1, wherein a first and second time periods each adjacent to one switching point of two switching points existing in each of the previous subframe and the next subframe are changed to the downlink time period and the uplink time period.

4. The method of claim 1, wherein a first time period and a second time period being spaced apart at the greatest distance from each other among a plurality time periods existing in the previous subframe and the next subframe are changed to the uplink time period and the downlink time period.

5. The method of claim 1, wherein a first four time periods among a plurality of time periods existing in a first subframe among four consecutive subframes are changed to one of the uplink time period and the downlink time period, and a last four time periods among a plurality of time periods existing in the last subframe among the four consecutive subframes are changed to one of the uplink time period and the downlink time period.

6. The method of claim 1, wherein at least two orthogonal codes among a plurality of channelization orthogonal codes used in two time periods among a plurality of time periods existing in a first subframe among four consecutive subframes are changed to one of orthogonal codes for the uplink time period and orthogonal codes for the downlink time period, and at least two orthogonal codes among a plurality of channelization orthogonal codes used in two time periods among a plurality of time periods existing in the last subframe among the four consecutive subframes are changed to one of orthogonal codes for the uplink time period and orthogonal codes for the downlink time period.

7. A method for measuring by a UE (User Equipment) a synchronization signal on a control channel and second Node B information from a second Node B in a system including a first Node B, the second Node B adjacent to the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a communication technique different from that of the TDD CDMA communication technique, the synchronization signal for synchronizing the UE with the second Node B and the control channel indicating the second Node B information being transmitted over at least one downlink channel transmitted from the second Node B to the UE, the method comprising the step of:

changing a position of the time period over which the downlink channel is transmitted from the first Node B to the UE, and changing a position of the time period over which the uplink channel is transmitted from the UE to the first Node B, so that the time period of the control channel transmitted from the second Node B to the UE is located within a previous subframe and within one of a next subframe and a frame.

8. The method of claim 7, wherein a first time period and a second time period among a plurality of time periods in the previous subframe are changed to the downlink time period and the uplink time period, respectively, and a third and a fourth time periods each adjacent to a second switching point existing in the next subframe are changed to the downlink time period and the uplink time period, respectively.

9. The method of claim 7, wherein a first and a second time periods each adjacent to one switching point of two switching points existing in each of the previous subframe and the next subframe are changed to the downlink time period and the uplink time period.

10. The method of claim 7, wherein a first time period and a second time period being spaced apart at the greatest distance from each other among a plurality time periods existing in the previous subframe and the next subframe are changed to the uplink time period and the downlink time period.

11. The method of claim 7, wherein a first four time periods among a plurality of time periods existing in a first subframe among four consecutive subframes are changed to one of the uplink time period and the downlink time period, and a last four time periods among a plurality of time periods existing in the last subframe among the four consecutive subframes are changed to one of the uplink time period and the downlink time period.

12. The method of claim 7, wherein at least two orthogonal codes among a plurality of channelization orthogonal codes used in two time periods among a plurality of time periods existing in a first subframe among four consecutive subframes are changed to one of orthogonal codes for the uplink time period and orthogonal codes for the downlink time period, and at least two orthogonal codes among a plurality of channelization orthogonal codes used in two time periods among a plurality of time periods existing in the last subframe among the four consecutive subframes are changed to one of orthogonal codes for the uplink time period and orthogonal codes for the downlink time period.

13. A method for measuring by a UE (User Equipment) a synchronization signal on a control channel and second Node B information from a second Node B in a system including a first Node B, the second Node B adjacent to the first Node B, a radio network controller (RNC) for managing the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronization signal for synchronizing the UE with the second Node B and the control channel indicating the second Node B information being transmitted over at least one downlink channel transmitted from the second Node B to the UE, the method comprising the steps of:

determining by the RNC all parameters available for measurement of the synchronization signal and the second Node B information, transmitting the determined parameters to the first Node B during radio link setup, and transmitting the determined parameters to the UE during radio bearer setup;

if it is recognized by the RNC that measurement of the synchronization signal and the second Node B information is necessary, transmitting to the first Node B and the UE parameter selection information for measuring the synchronization signal and the second Node B information;

changing by the first Node B and the UE a position of a downlink time period over which the downlink channel is transmitted from the first Node B to the UE and a position of an uplink time period over which the uplink channel is transmitted from the UE to the first Node B, according to parameters selected from all the parameters based on the parameter selection information; and receiving by the UE the synchronization signal and the second Node B information transmitted from the second Node B in the time periods except the changed downlink time period and the changed uplink time period among the plurality of time periods.

14. The method of claim 13, wherein each of the parameters comprises a measurement period starting point (MPSP), a measurement period (MP), a measurement period interval (MPI), a measurement period sequence (MPS), and a measurement period sequence repetition number (MPSRN).

15. The method of claim 13, wherein the parameter selection information is an index indicating any one of the parameters.

16. The method of claim 13, wherein the parameters are determined based on positions of a downlink time period and an uplink time period, where the time periods of the control channel transmitted from the second Node B can be located within a previous subframe and within one of a next subframe and a frame.

17. The method of claim 16, wherein the changed downlink time period and the changed uplink time period in the previous subframe and the next subframe occur in succession, and the changed downlink time period and the changed uplink time period in the previous subframe are spaced apart as far as possible from the changed downlink time period and the changed uplink time period in the next subframe.

18. A method for measuring by a UE (User Equipment) a synchronization signal on a control channel and second Node B information from a second Node B in a system including a first Node B, the second Node B adjacent to the first Node B, a radio network controller (RNC) for managing the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronization signal for synchronizing the UE with the second Node B and the control channel indicating the second Node B information being transmitted over at least one downlink channel transmitted from the second Node B to the UE, the method comprising the steps of:

- determining by the RNC all parameters available for measurement of the synchronization signal and the second Node B information, transmitting any one of the determined parameters to the first Node B and the UE if the RNC recognizes that the UE is required to measure the synchronization signal and the second Node B information;
- changing by the first Node B and the UE a position of a downlink time period over which the downlink channel is transmitted from the first Node B to the UE and a position of an uplink time period over which the uplink channel is transmitted from the UE to the first Node B, according to parameters selected by the RNC based on parameter selection information; and
- receiving by the UE the synchronization signal and the second Node B information transmitted from the second Node B in time periods except the changed downlink time period and the changed uplink time period among the plurality of time periods.

19. The method of claim 18, wherein each of the parameters comprises a measurement period starting point (MPSP), a measurement period (MP), a measurement period interval (MPI), a measurement period sequence (MPS), and a measurement period sequence repetition number (MPSRN).

20. The method of claim 18, wherein the parameter selection information is an index indicating any one of the parameters.

21. The method of claim 18, wherein the parameters are determined based on positions of a downlink time period and an uplink time period, where the time periods of the control channel transmitted from the second Node B can be located within a previous subframe and within one of a next subframe and a frame.

22. The method of claim 21, wherein the changed downlink time period and the changed uplink time period in the previous subframe and the next subframe occur in succession, and the changed downlink time period and the changed uplink time period in the previous subframe are spaced apart as far as possible from the changed downlink time period and the changed uplink time period in the next subframe.

23. An apparatus for measuring by a UE (User Equipment) a synchronization signal on a control channel and second Node B information from a second Node B in a system including a first Node B, the second Node B adjacent to the first Node B, a radio network controller (RNC) for managing the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronization signal for synchronizing the UE with the second Node B and the control channel indicating the second Node B information being transmitted over at least one downlink channel transmitted from the second Node B to the UE, the apparatus comprising:

- the RNC for determining all parameters available for measurement of the synchronization signal and the second Node B information, transmitting the determined parameters to the first Node B during radio link setup, transmitting the determined parameters to the UE during radio bearer setup, and transmitting to the first Node B and the UE parameter selection information for measuring the synchronization signal and the second Node B information, if it is recognized that measurement of the synchronization signal and the second Node B information is necessary;
- the first Node B for changing a position of a downlink time period over which the downlink channel is transmitted from the first Node B to the UE and a position of an uplink time period over which the uplink channel is transmitted from the UE to the first Node B, according to parameters selected from all the parameters based on the parameter selection information; and
- the UE for changing a position of a downlink time period over which the downlink channel is transmitted from the first Node B to the UE and a position of an uplink time period over which the uplink channel is transmitted from the UE to the first Node B, according to parameters selected from all the parameters based on the parameter selection information, and receiving the synchronization signal and the second Node B information transmitted from the second Node B in time periods except the changed downlink time period and the changed uplink time period among the plurality of time periods.

24. The apparatus of claim 23, wherein each of the parameters comprises a measurement period starting point (MPSP), a measurement period (MP), a measurement period interval (MPI), a measurement period sequence (MPS), and a measurement period sequence repetition number (MPSRN).

25. The apparatus of claim 23, wherein the parameter selection information is an index indicating any one of the parameters.

26. The apparatus of claim 23, wherein the parameters are determined based on positions of a downlink time period and an uplink time period, where the time periods of the control channel transmitted from the second Node B can be located within a previous subframe and within one of a next subframe and a frame.

27. The apparatus of claim 26, wherein the changed downlink time period and the changed uplink time period in the previous subframe and the next subframe occur in succession, and the changed downlink time period and the changed uplink time period in the previous subframe are spaced apart as far as possible from the changed downlink time period and the changed uplink time period in the next subframe.

28. An apparatus for measuring by a UE (User Equipment) a synchronization signal on a control channel and second Node B information from a second Node B in a system including a first Node B, the second Node B adjacent to the first Node B, a radio network controller (RNC) for managing the first Node B, and the UE in a cell occupied by the first Node B, the first Node B and the UE using a TDD (Time Division Duplexing) CDMA (Code Division Multiple Access) communication technique over a frame having a plurality of time periods, a downlink channel being transmitted from the first Node B to the UE over at least one time period among the plurality of time periods in the frame, an uplink channel being transmitted from the UE to the first Node B over at least one time period among the remaining time periods except the at least one time period over which the downlink channel is transmitted, the UE and the second Node B performing communication by a frequency band or a communication technique different from that of the TDD CDMA communication technique, the synchronization signal for synchronization with the second Node B and the control channel indicating the second Node B information being transmitted over at least one downlink channel transmitted from the second Node B to the UE, the apparatus comprising:

the RNC for determining all parameters available for measurement of the synchronization signal and the second Node B information, transmitting any one of the determined parameters to the first Node B and the UE if it is recognized that the UE is required to measure the synchronization signal and the second Node B information;

the first Node B for changing a position of a downlink time period over which the downlink channel is transmitted from the first Node B to the UE and a position of an uplink time period over which the uplink channel is transmitted from the UE to the first Node B, according to parameters selected by the RNC based on parameter selection information; and the UE for changing a position of a downlink time period over which the downlink channel is transmitted from the first Node B to the UE and a position of an uplink time period over which the uplink channel is transmitted from the UE to the first Node B, according to parameters selected by the RNC based on parameter selection information, and receiving the synchronization signal and the second Node B information transmitted from the second Node B in time periods except the changed downlink time period and the changed uplink time period among the plurality of time periods.

29. The apparatus of claim 28, wherein each of the parameters comprises a measurement period starting point (MPSP), a measurement period (MP), a measurement period interval (MPI), a measurement period sequence (MPS), and a measurement period sequence repetition number (MPSRN).

30. The apparatus of claim 28, wherein the parameter selection information is an index indicating any one of the parameters.

31. The apparatus of claim 28, wherein the parameters are determined based on positions of a downlink time period and an uplink time period, where the time periods of the control channel transmitted from the second Node B can be located within a previous subframe and within one of a next subframe and a frame.

32. The apparatus of claim 31, wherein the changed downlink time period and the changed uplink time period in the previous subframe and the next subframe occur in succession, and the changed downlink time period and the changed uplink time period in the previous subframe are spaced apart as far as possible from the changed downlink time period and the changed uplink time period in the next subframe.

* * * * *